United States Patent [19]

Temma et al.

[11] Patent Number: 5,796,996
[45] Date of Patent: Aug. 18, 1998

[54] PROCESSOR APPARATUS AND ITS CONTROL METHOD FOR CONTROLLING A PROCESSOR HAVING A CPU FOR EXECUTING AN INSTRUCTION ACCORDING TO A CONTROL PROGRAM

[75] Inventors: Shoji Temma; Jun Funaki, both of Kawasaki, Japan

[73] Assignee: Fujitsu Limited, Kawasaki, Japan

[21] Appl. No.: 502,351

[22] Filed: Jul. 14, 1995

[30] Foreign Application Priority Data

Nov. 11, 1994 [JP] Japan ................... 6-277287

[51] Int. Cl.$^6$ .................................................. G06F 12/00
[52] U.S. Cl. .................. 395/566; 395/561; 395/568; 395/584; 395/881; 395/733; 395/739
[58] Field of Search .................. 395/561, 565, 395/566, 567, 733, 584, 735, 739–740, 881

[56] References Cited

U.S. PATENT DOCUMENTS

| | | | |
|---|---|---|---|
| 5,003,558 | 3/1991 | Gregg | 375/357 |
| 5,170,470 | 12/1992 | Pindar et al. | 395/828 |
| 5,495,593 | 2/1996 | Elmer et al. | 711/103 |
| 5,499,384 | 3/1996 | Lentz et al. | 395/821 |
| 5,519,841 | 5/1996 | Sager et al. | 395/393 |
| 5,594,704 | 1/1997 | Konishi et al. | 365/233 |

*Primary Examiner*—Parshotam S. Lall
*Assistant Examiner*—Bharat Barot
*Attorney, Agent, or Firm*—Staas & Halsey

[57] ABSTRACT

In the case where a CPU executes a write instruction of a control program for a memory mapped register of an external memory, a write address and write data are written into an output buffer, thereby completing the write instruction. Prior to executing a read instruction subsequent to the write instruction, the write address and the write data of the output buffer are transferred to a sync buffer and are stored into a write address holding register and a write data holding register. Further, a using state display register is set into the holding state. When the CPU executes the read instruction, the write data of the write data holding register is written into the memory mapped register and the end of the writing operation is synchronized with the end of the read instruction. When the sync buffer unit receives an interruption instruction in the holding state, an interruption return instruction address is returned to an address of the write instruction of the data in the holding state. The process is restarted from the write instruction of the memory mapped register by the control program by the end of the interruption.

17 Claims, 21 Drawing Sheets

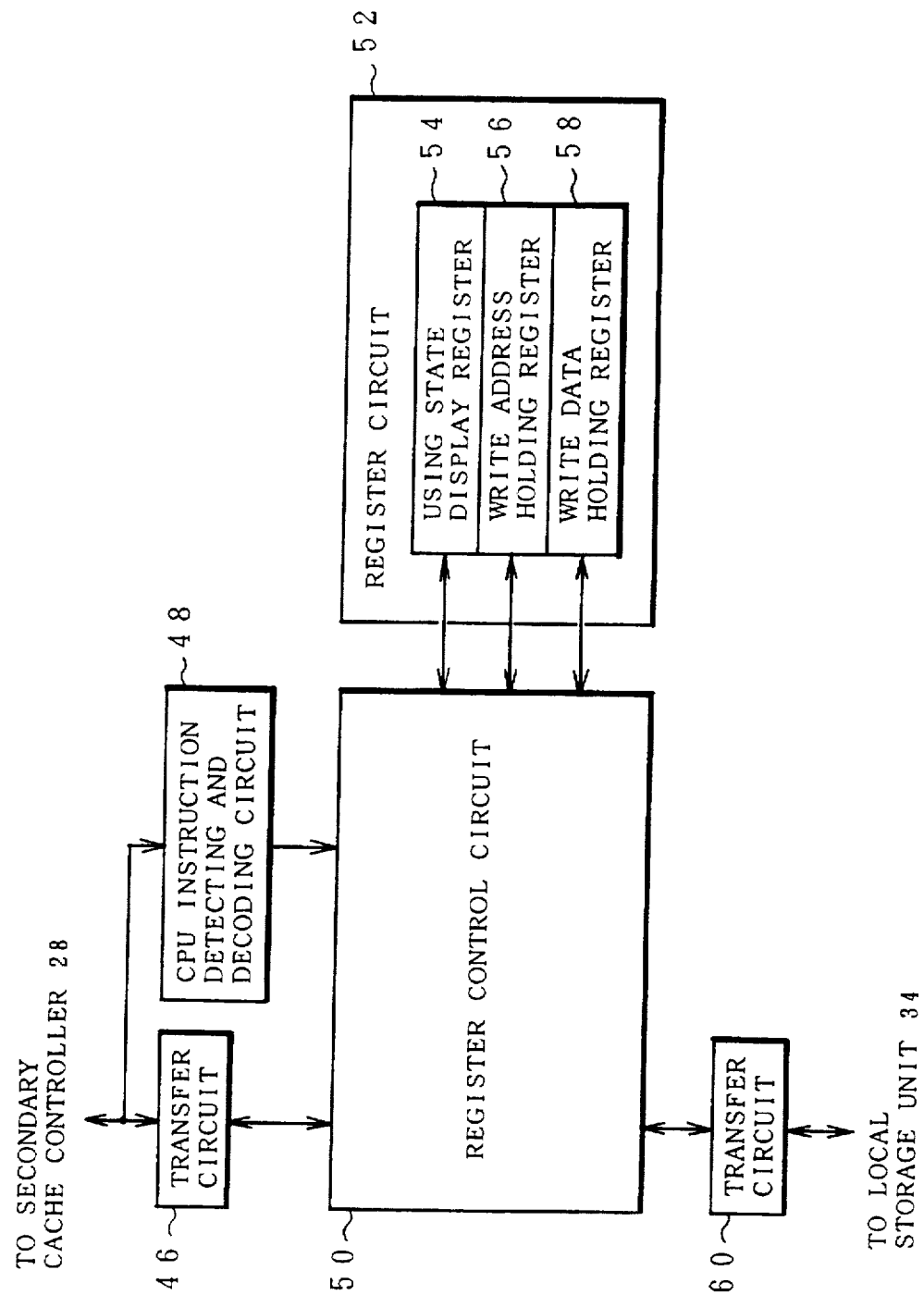

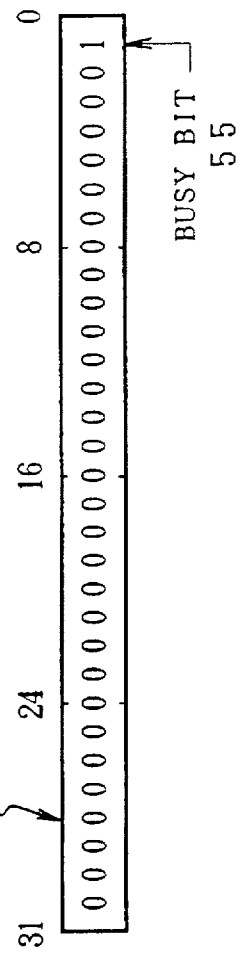
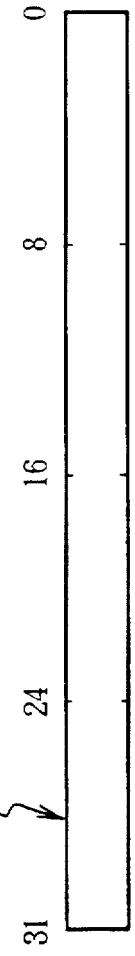
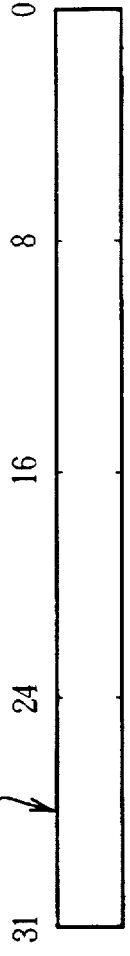
F I G. 9A  F I G. 9B  F I G. 9C

PROCESSOR APPARATUS AND ITS CONTROL METHOD FOR CONTROLLING A PROCESSOR HAVING A CPU FOR EXECUTING AN INSTRUCTION ACCORDING TO A CONTROL PROGRAM

BACKGROUND OF THE INVENTION

The invention relates to a processor apparatus having an output buffer which stores a result of an execution of a write instruction to an external memory or the like of a CPU and finishes the instruction and to a control method of such an apparatus. More particularly, the invention relates to a processor apparatus for finishing a writing operation to a bit mapped register of a write address and write data stored in an external output buffer by a write instruction of a CPU for a memory mapped register in an external memory synchronously with a read instruction of the CPU, which will be explained hereinlater, and to a control method of such an apparatus.

In recent years, as one of techniques to realize a high processing speed of a CPU by making a hierarchy in a memory, there is an instruction processing method of finishing a write instruction at a stage when data that is outputted to an external memory or a memory mapped register or the like formed in the external memory by the execution of a write instruction by the CPU has been stored in an internal buffer of the CPU and a buffer out of the CPU. Such a buffer is called an output buffer. As output buffers, generally, there are: an internal output buffer using a cache memory of a primary cache unit provided in the CPU as a storage buffer; and an external output buffer using a cache memory of a secondary cache unit out of the CPU. According to such an instruction processing method, a write instruction accompanied with data output (write address and write data) to the external memory which was executed by the CPU is finished at a time point when the data has been stored in the output buffer, thereby reducing an actual writing time to the memory, namely, the time during which the CPU is restricted.

FIG. 1 shows a conventional instruction processing method using an output buffer. First, a CPU 700 executes a write instruction 800 to an external memory 740 in accordance with a control program. The execution of the write instruction 800 is normally finished when a write address and write data are stored into an internal output buffer 710 of the CPU 700, and the CPU 700 is released. A transfer writing operation 810 from the internal output buffer 710 to an external output buffer 730 of a secondary cache unit 720 is sequentially executed asynchronously with the execution of the instruction of the CPU 700. The writing operation from the external output buffer 730 to the external memory 740 as a target to be accessed is also sequentially executed asynchronously with the execution of the instruction of the CPU 700 in a manner similar to the above. When an abnormality occurs in the writing from the internal output buffer 710 to the external output buffer 730 or in the writing from the external output buffer 730 to the external memory 740, the internal output buffer 710 and external output buffer 730 are freezed in a state in which the stored address and data are held. After that, the freezed state is continued until the program of the CPU 700 executes a freeze cancellation instruction. For such a period of time, as for the execution of the instruction of the CPU 700 in association with the writing operation to the external memory 740, the writing operation is directly performed to the external memory 740 without using the internal output buffer 710 and external output buffer 730. The CPU 700 executes a write recovery process in the freezed state. In the write recovery process, the CPU 700 recognizes the write address and write data held in the internal output buffer 710 and external output buffer unit 730 in the freezed state and the CPU 700 itself directly executes the recovery process to again write them into the external memory 740. After completion of the write recovery process, the CPU 700 cancels the freezed states of the internal output buffer 710 and external output buffer unit 730 and is returned to an accessing state using the internal output buffer 710 and external output buffer unit 730.

Such a writing operation to the external memory of the CPU using the output buffer and such a recovery process when an abnormality of the writing operation occurs don't cause a problem in the case where a write destination side is a passive device like an external memory 740. However, in the case where the write destination side is an active device like a memory mapped register 750, namely, for example, in case of a control register or the like of an external storage device which operates by the writing operation, such a write recovery process cannot be performed by a simple rewriting operation such that the output buffer is freezed at the time of the occurrence of an abnormality and the CPU 700 directly writes into the memory mapped register 750. Ordinarily, as shown in FIG. 2, the memory mapped register 750 which functions as a control register sequentially executes a plurality of write instructions such as write instructions 801, 802, and 803 by the CPU 700. The necessary register writing operation is completed by writing operations 811, 812, and 813 of three times. The operation according to the register contents is executed by the reading operation of the CPU 700 after completion of the writing operation. When an abnormality occurs in the writing operations 811, 812, and 813 of the memory mapped register 750, sequences of subsequent write instructions are made different. For example, the sequence of the write instructions when there is no write abnormality is set to the or der of "write instruction 1", "write instruction 2", and "write instruction 3". On the other hand, for example, when there is an abnormality in the writing operation of the "write instruction 1", the processing routine advances from step S2 to step S8. A subsequent instruction sequence differs from that of "write instruction 4" and "write instruction 3". As mentioned above, in case of the memory mapped register 750 in which the register contents are determined by a plurality of writing operations, as a recovery process for the write abnormality, the internal output buffer 710 and external output buffer 730 are freezed and even when the CPU 700 recognizes the freezed write address and data and directly rewrites to the memory mapped register 750, the register contents cannot be recovered. This is because in spite of the fact that the sequences of subsequent write instructions are made different due to the write abnormality, the writing operation is executed in a state in which the sequence is returned to the instruction sequence of no abnormality, so that the rewriting operation itself becomes an error.

The problem regarding the recovery process of the write abnormality of the memory mapped register 750 can be solved by synchronizing the completion of the writing operation to the memory mapped register 750 with the completion of the execution of the CPU instruction instead of the conventional method whereby they are asynchronously performed. Specifically speaking, it is sufficient to provide an access instruction which doesn't pass through the output buffer and to execute the recovery process. However, although such an access method is effective for the internal output buffer 710 which is provided in the CPU 700 and can be directly accessed, it is not generally effective to the external output buffer 730 such as a secondary cache unit 720 or the like provided out of the CPU 700. Therefore, an access method in which a forced ejecting function is given to the output buffer is used. According to the access method in which the forced ejecting function is given to the output buffer, the operating state is set to a state in which an external interruption to the memory mapped register 750 is not accepted by the CPU 700, namely, into an interruption masking state, and the writing operation from the output buffer to the memory mapped register 750 is executed by the following procedure.

I. The CPU is set to the interruption masking state.

II. The CPU executes the write instruction of the memory mapped register and stores the write address and data into the output buffer.

III. The writing operation of the memory mapped register is executed synchronously with the execution of the CPU instruction by the forced ejection of the output buffer.

IV. The interruption masking state of the CPU is cancelled.

The reason why the CPU 700 is set to the interruption masking state by the write access of the memory mapped register 750 is as follows. In a state before the ejection in which the write data and write address are held in the external output buffer 730, when an external interruption in which the memory mapped register 750 is set to the interruption destination side occurs, the writing operation of the memory mapped register 750 using the output buffer ejecting function is executed by the interrupting process. When the write abnormality occurs in this instance, a problem such that the write recovery cannot be performed occurs in association with a change in write instruction sequence. Therefore, for a period of time during which the write instruction of the memory mapped register 750 is executed, the CPU 700 is set to the interruption masking state, thereby inhibiting that the external interruption is accepted. As for the forced ejecting function of the output buffer, in the ordinary operation of the CPU, since the read instruction is executed subsequently to the write instructions (a plurality of instructions) of the mapped register 750, the ejecting operation is executed at the time of the execution of the read instruction of the CPU and the execution of the read instruction of the CPU is completed synchronously with the completion of the ejection. As another method, there is also a method of providing an exclusive-use instruction for the forced ejection to the CPU, it is not generally used.

FIG. 4 shows the writing operation of the memory mapped register by the forced ejecting function of the output buffer. First, the CPU 700 performs a write instruction execution 821 of the memory mapped register 750 in the interruption masking state, stores the write address and write data into the internal output buffer 710, and finishes the instruction execution. Subsequently, the CPU 700 executes the read instruction of the memory mapped register 750. Prior to executing the read instruction, a transfer writing operation 822 from the internal output buffer 710 to the external output buffer 730 is executed. For example, the transfer writing operation 822 is executed at an instruction fetching cycle for fetching the next read instruction in the CPU 700. Subsequently, when the CPU 700 executes the read instruction, a bus operation by the execution of the read instruction is detected by the secondary cache unit 720 and a writing operation 823 to an access target to write the data held in the external output buffer 730 to the memory mapped register 750 is executed. When the writing operation 823 of the memory mapped register 750 is normally finished, the completion of the ejection is notified to the CPU 700 together with a response of the read data by the execution of the read instruction. On the other hand, when there is an abnormality in the writing operation of the memory mapped register 750, the write abnormality is notified to the CPU 700 synchronously with the response of the read data by the execution of the read instruction. The CPU 700 recognizes the write abnormality to the memory mapped register 750 in a real-time manner and executes the rewriting operation of the abnormality recovery. Therefore, when the write abnormality is notified during the writing operation corresponding to a plurality of write instructions, the subsequent instruction sequence is changed and it is possible to certain write into the memory mapped register 750.

In the conventional processes of the write instruction of the memory mapped register using the ejecting function of the output buffer as mentioned above, however, since an access frequency of the memory mapped register as a target of the write instruction is very high, there is a problem such that each time the memory mapped register is accessed, the CPU executes the processes for setting and cancelling the interruption masking state and a write overhead is large. There is also a problem such that in spite of the fact that the frequency of the write abnormality of the memory mapped register is low, since the interruption masking state of the CPU is often set, a response performance of the external interruption deteriorates.

SUMMARY OF THE INVENTION

According to the invention, there are provided a processor apparatus and its control method which can properly cope with the occurrence of a write abnormality of a target in the case where the execution of a write instruction of an external target is completed by the writing to an output buffer without inhibiting an external interruption to a CPU.

A CPU has: a control program processing section for executing an instruction according to a control program; and an interruption program processing section for interrupting the execution of the control program processing section due to the occurrence of an external interruption and for executing an instruction of an interruption program. A memory mapped register is provided as a target in an external memory of the CPU. An output buffer section (internal output buffer and external output buffer) receives and stores a write address and write data to the memory mapped register due to the execution of a write instruction of the CPU and finishes the write instruction of the CPU. A sync buffer circuit section has: a using state display register indicative of a holding state of the write address and write data; a write address holding register for holding the write address; and a write data holding register for holding the write data. Prior to the execution of a read instruction subsequent to the write instruction to the memory mapped register of the CPU, a sync buffer circuit section stores the write address and write data which were transferred from the output buffer section into the write address holding register and write data holding register, respectively, and also sets the using state display register into a data holding state. Subsequently, in association with the execution of the read instruction of the CPU, the sync buffer circuit section writes the write data of the write data holding register into the memory mapped register and synchronizes the end of the writing operation with a response of read data by the read instruction. Specifically speaking, when the writing operation to the memory mapped register is normally finished, the data of the write data holding register is responded to the CPU as read data of dummy. When an abnormality occurs in the writing operation to the memory mapped register, an abnormal end of the writing operation is notified to the CPU synchronously with the read data by the read instruction of the CPU. Further, as necessary, the sync buffer circuit section writes the data to the memory mapped register and, after that, clears the using state display register and sets into a non-holding state.

When an external interruption for the memory mapped register occurs, in the case where the data holding state is discriminated by referring to the using state display register of the sync buffer circuit section, an interruption program processing section of the CPU returns a return instruction address to the control program at the end of the interruption to an address of the write instruction of the write address and write data in the holding state and, after completion of the interrupting process, the control program is executed from the write instruction address which was returned. Specifically speaking, after the write instruction of the memory mapped register had been finished by the control program processing section, in the case where an external interruption occurs for a period of time until the read instruction is executed after the write data and write address of the output buffer unit were transferred to the sync buffer circuit section before the next read instruction, the interruption program processing section reads out the using state display register of the sync buffer circuit section. When the sync buffer circuit section is in a holding state, the instruction address of the interruption recovery is returned by one instruction and the interrupting process for the memory mapped address is executed, thereby restarting from the write instruction of the memory mapped register by the end of the interruption.

Generally, the control program processing section of the CPU executes the read instruction of the memory mapped register after a plurality of write instructions to the memory mapped register were executed. In the case where an abnormality report of the writing operation is received from the sync buffer circuit section in association with the end of the execution of the read instruction subsequent to a plurality of write instruction for the memory mapped register, the control program processing section of the CPU executes the subsequent writing operation to the memory mapped register by the execution of a different write instruction train. The memory mapped register is, for example, a control register of an input/output control apparatus.

The output buffer section is constructed by an internal output buffer (storage buffer) provided in the CPU and an external output buffer provided out of the CPU. The control program processing section of the CPU finishes the write instruction for the memory mapped register by the writing operation for the internal output buffer. The write address and read address stored in the internal output buffer are transferred to the sync buffer circuit section via an external output buffer unit prior to executing the read instruction subsequent to the write instruction. The internal output buffer is a cache memory of a primary cache section provided in the CPU. The external output buffer unit is a cache memory of a secondary cache section provided out of the CPU.

The invention also provides a control method of a processor.

In a writing step, when the CPU executes a write instruction for a memory mapped register mapped on an external memory, a write address and write data to the memory mapped register are written from a CPU to an output buffer (for example, internal output buffer of the CPU) and the write instruction is finished.

In the next buffer transfer step, prior to executing a read instruction subsequent to the write instruction for the memory mapped register by the CPU, the write address and write data of the output buffer section are transferred to a sync buffer circuit section and stored into a write address holding register and a write data holding register, respectively, and a using state display register is set into a data holding state.

In the next synchronizing step, the write data in the write data holding register is written into the memory mapped register in association with the execution of the read instruction of the CPU and the end of the writing operation is synchronized with the response of read data by the read instruction.

Further, an interruption processing step is provided and when an external interruption for the memory mapped register occurs, in the case where the data holding state is discriminated with reference to the using state display register of the sync buffer circuit section, a return instruction address to a control program at the end of the interruption is returned to an address of the write instruction of the write address and write data in the data holding state at the time of the occurrence of an interruption, and the control program is executed from the write instruction address returned by the end of the interrupting process.

According to such processor apparatus and its control method of the present invention, a function to set an interruption masking state to inhibit an external interruption for the memory mapped register doesn't need to be provided for the control program for executing an access of the memory mapped register, and the external interruption is accepted as it is and is executed. In place of setting an interruption mask into the CPU by the control program, according to the invention, a corresponding function is provided for an interrupting program of the memory mapped register due to the occurrence of the external interruption. Prior to the interrupting process, the interrupting program checks to see if the sync buffer circuit section is in the data holding state or not. If YES, the write data and write address held in the sync buffer circuit section are broken by the interrupting process for the memory mapped register as a target. Therefore, the return instruction address of the control program that is returned by the end of the interruption is returned to the address of the write instruction of the write address and write data which are broken. Thus, when the interrupting process is finished, although the write instruction was executed by the CPU, a write instruction which is not yet written to the memory mapped register is again executed by the CPU. Even when an external interruption occurs, the writing operation of the memory mapped register by the control program can be certainly executed. Therefore, there is no need to set the CPU into the interruption masking state by the access of the memory mapped register by the control program. A write overhead in association with it can be eliminated. Even during the access of the memory mapped register by the control program, when an external interruption occurs, the interrupting process by the interrupting program of the memory mapped register is immediately executed and the inherent interruption response performance can be maintained.

The above and other objects, features, and advantages of the present invention will become more apparent from the following detailed description with reference to the drawings.

BRIEF DESCRIPTION OF THE DRAWINGS

FIG. 8 is a block diagram of a sync buffer circuit section in FIG. 6;

FIGS. 9A to 9C are explanatory diagrams of registers provided for the sync buffer circuit section in FIG. 6;

DETAILED DESCRIPTION OF THE PREFERRED EMBODIMENT

Figure 1:
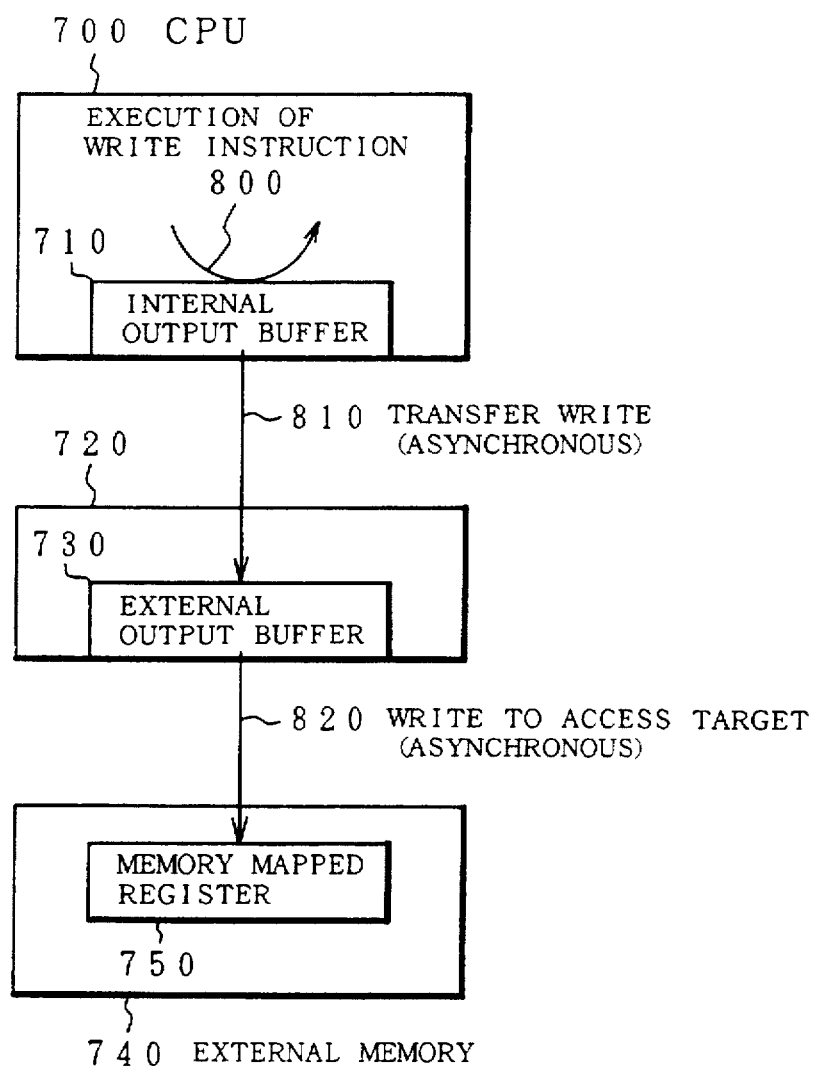
FIG. 1 is a block diagram of an accessing function of an external memory using a conventional output buffer.
Figure 2:
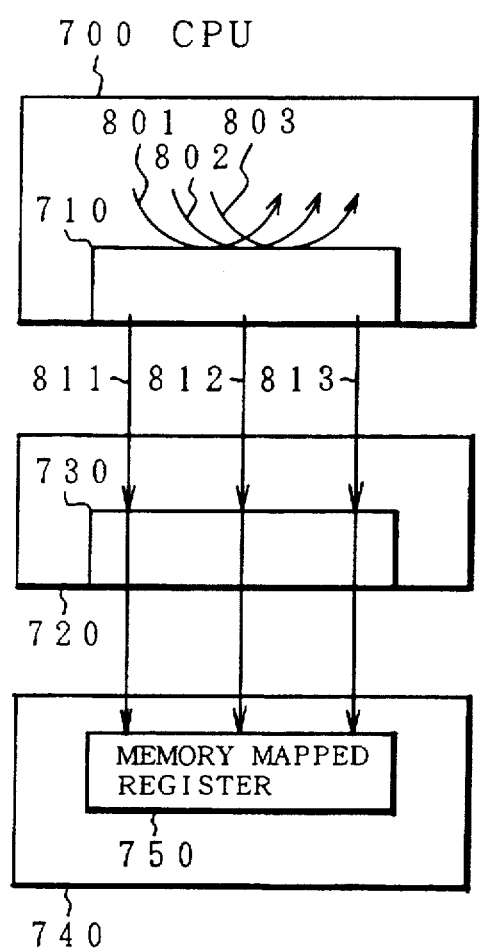
FIG. 2 is an explanatory diagram of the writing operation by a plurality of write instructions for a memory mapped register.
Figure 3:
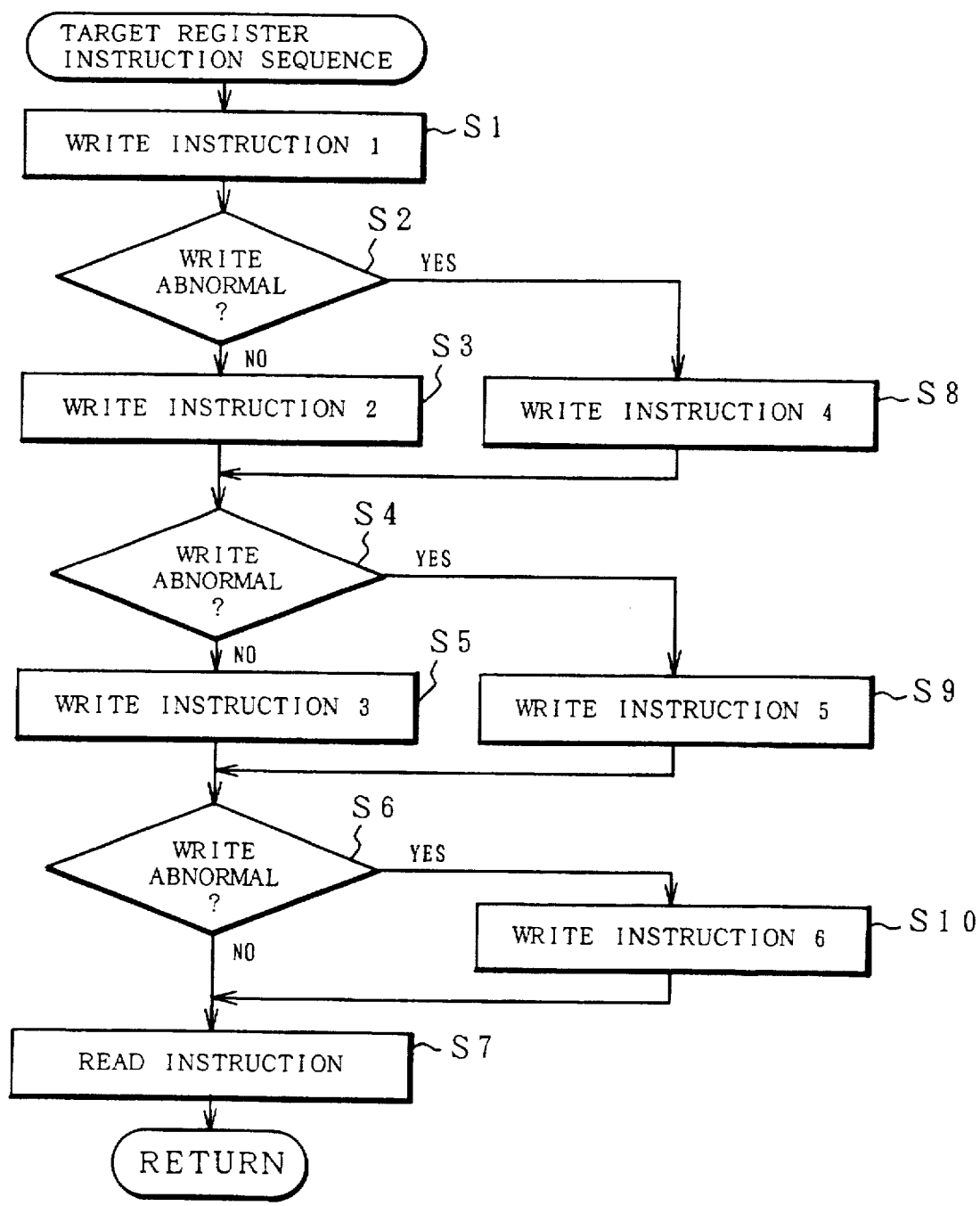
FIG. 3 is a flowchart for an access instruction sequence for the memory mapped register.
Figure 4:
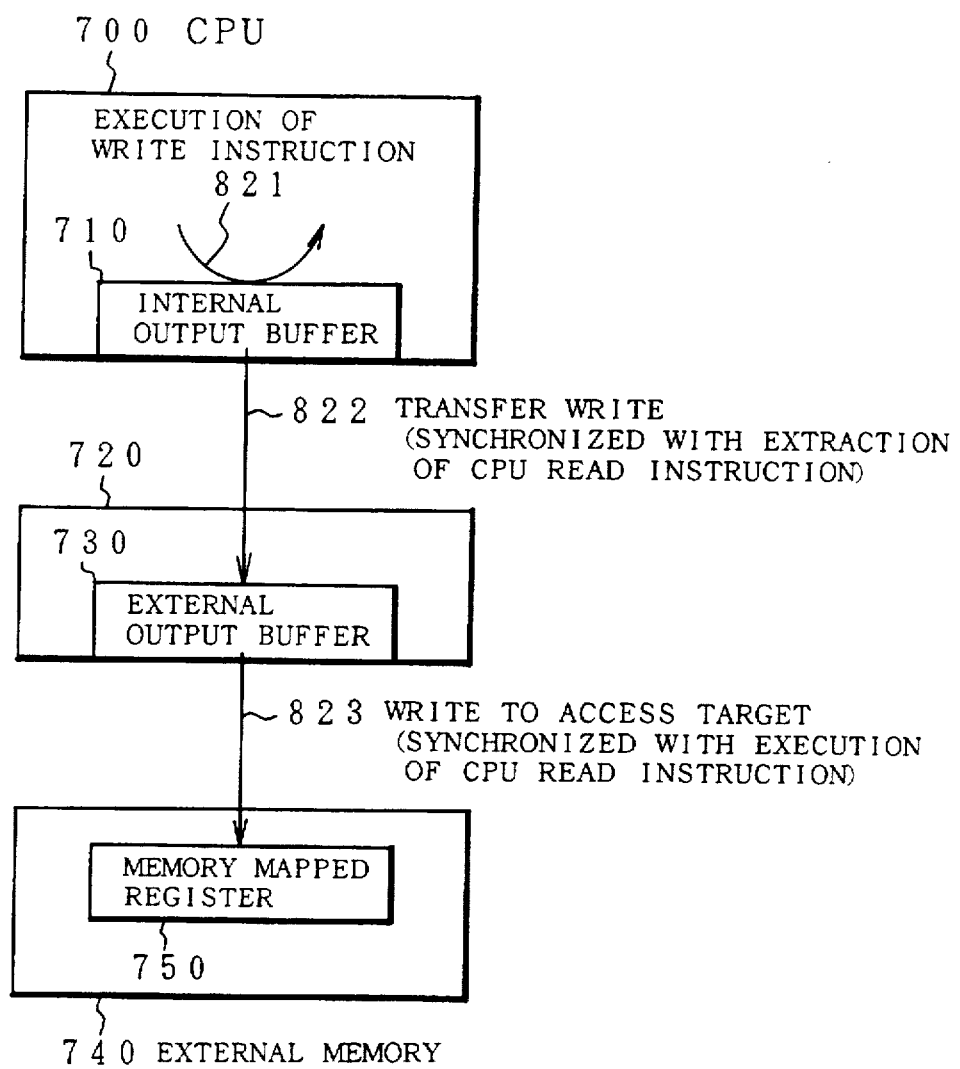
FIG. 4 is an explanatory diagram of an accessing method in which the writing operation is synchronized with the execution of an instruction of a CPU.
Figure 5:
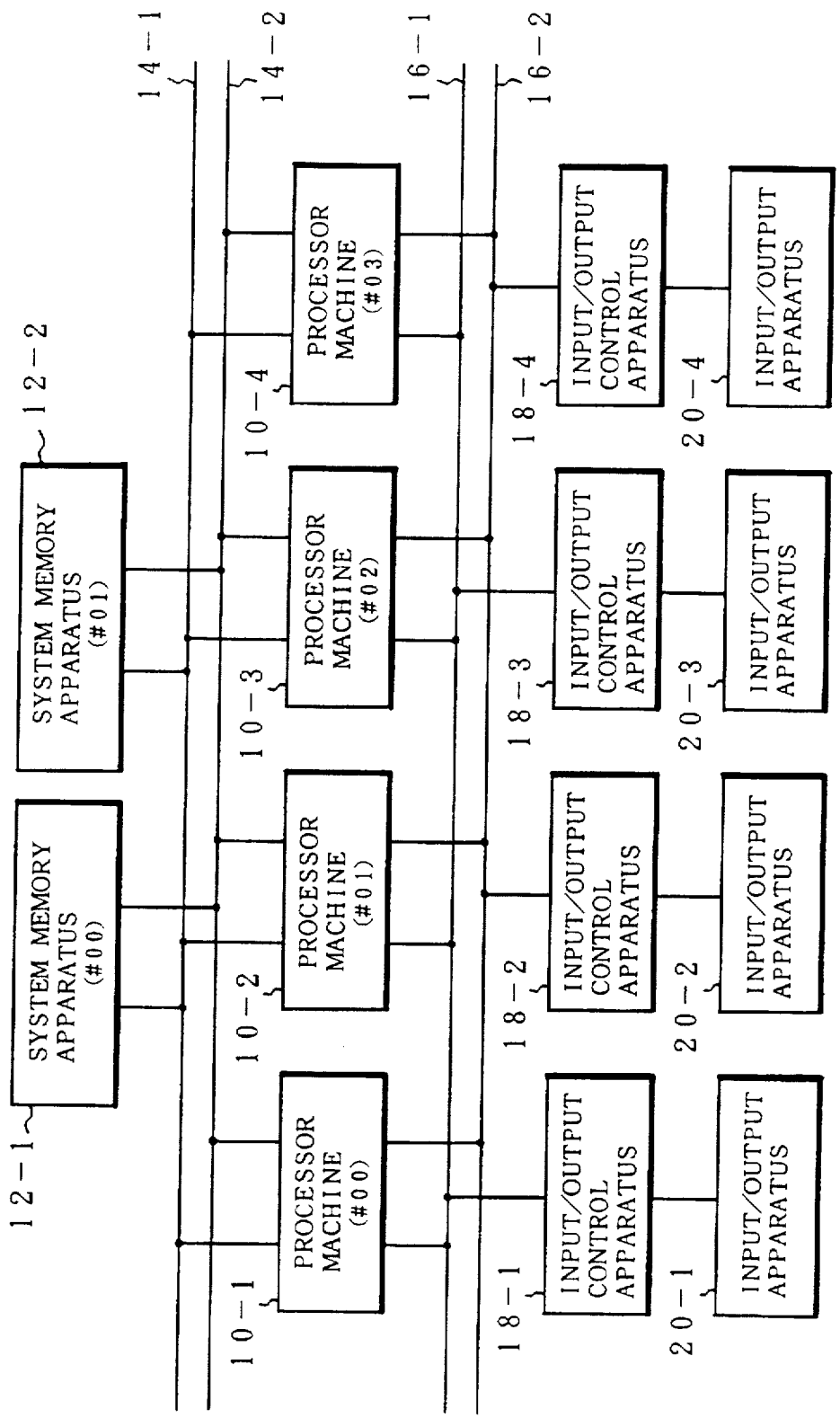
FIG. 5 is a system constructional diagram serving as an operation environment of the invention.

FIG. 5 is a diagram showing a computer system serving as an operation environment of a processor apparatus of the invention. In the computer system, four processor machines 10-1 to 10-4 are provided. ID numbers of the processor machines 10-1 to 10-4 are set to #00 to #03. System memory apparatuses 12-1 and 12-2 are connected to the processor machines 10-1 to 10-4 by system buses 14-1 and 14-2. For example, four input/output (I/O) control apparatuses 18-1 to 18-4 are connected to the processor machines 10-1 to 10-4 through input/output buses 16-1 and 16-2. Input/output apparatuses 20-1 to 20-4 are connected to the I/O control apparatuses 18-1 to 18-4, respectively. As I/O apparatuses 20-1 to 20-4, a magnetic disk apparatus, an optical disk apparatus, a magnetic tape apparatus, a printer, a keyboard, a mouse, a man-machine interface such as a tablet or the like, a communication control apparatus with other computer systems, and the like are provided. The I/O control apparatuses 18-1 to 18-4 become input/output control modules corresponding to their I/O apparatuses. For example, in the case where the I/O control apparatus is a magnetic disk apparatus, the I/O control apparatus becomes the magnetic disk control apparatus. Although the computer system has the four processor machines 10-1 to 10-4 as an example, up to eight processor machines can be provided. The number of I/O control apparatuses can be properly extended as necessary.

Figure 6:
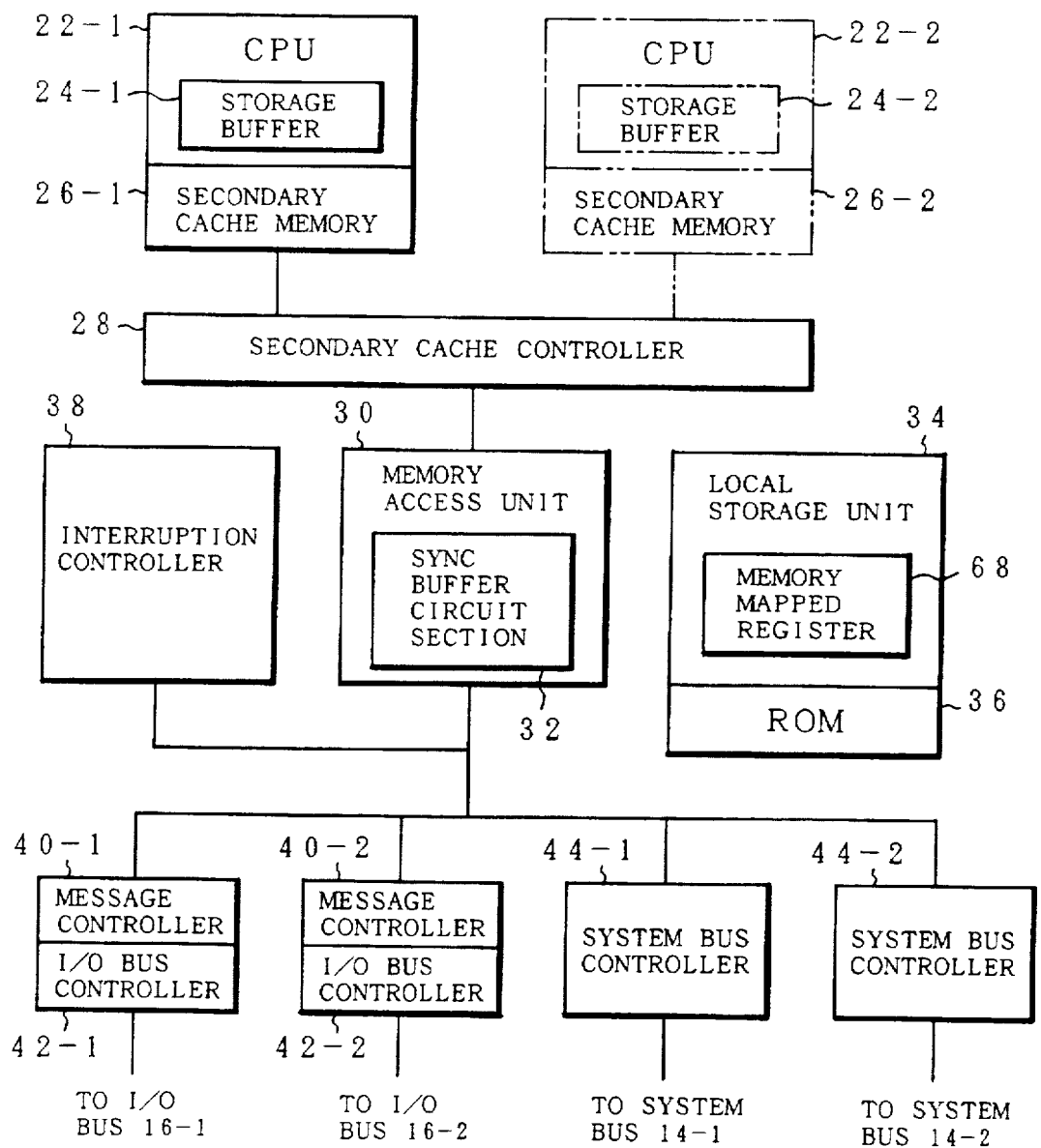
FIG. 6 is a block diagram of a processor machine in FIG. 5.

FIG. 6 shows a hardware construction of the processor machine 10-1 in FIG. 5. Each of the other processor machines 10-2 to 10-4 also has a hardware construction similar to that of the processor machine 10-1. A CPU 22-1 is provided for the processor machine. A primary cache unit is provided for the CPU 22-1. A cache memory of the primary cache unit is shown as a storage buffer 24-1.

Figure 7:
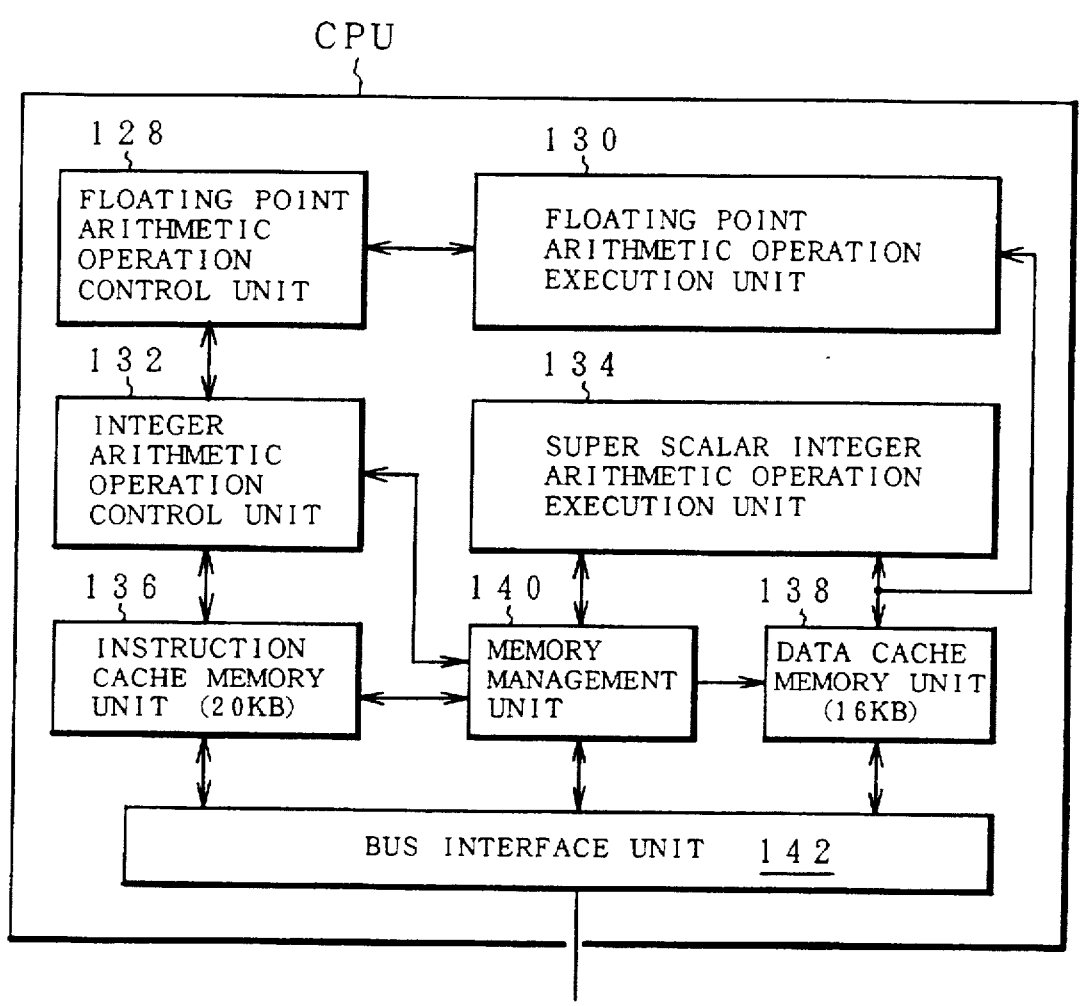
FIG. 7 is a block diagram of the CPU in FIG. 6.

FIG. 7 shows an internal construction of the CPU 22-1. The CPU 22-1 has: a floating point arithmetic operation control unit 128; a floating point arithmetic operation execution unit 130; an integer arithmetic operation control unit 132; a super scalar integer arithmetic operation execution unit 134; an instruction cache memory unit 136; a data cache memory unit 138; a memory management unit (MMU) 140; and a bus interface unit 142. The floating point arithmetic operation execution unit 130 executes a floating point arithmetic operation under control of the floating point arithmetic operation control unit 128. The super scalar integer arithmetic operation execution unit 134 discriminates integer arithmetic operation instructions that can be dynamically executed in parallel and executes integer arithmetic operations in parallel under control of the integer arithmetic operation control unit 132. The instruction cache memory unit 136 has a memory capacity of, for example, 20 kbytes and is subjected to a cache control by the memory management unit 140. Program codes fetched from an EEPROM 14 of a shared section that is used by the floating point arithmetic operation control unit 128 and integer arithmetic operation control unit 132 are stored in the instruction cache memory unit 136. After the program codes were once stored in the instruction cache memory unit 136, the floating point arithmetic operation control unit 128 and integer arithmetic operation control unit 132 execute arithmetic operations using the program codes of the instruction cache memory unit 136. The data cache memory unit 138 has a memory capacity of, for example, 16 kbytes and stores the data read out from an external memory that is used for the arithmetic operations of the floating point arithmetic operation execution unit 130 and super scalar integer arithmetic operation execution unit 134. A cache control of the data cache memory unit 138 is also executed by the memory management unit (MMU) 140. The data cache memory unit 138 functions as a storage buffer 24-1 serving as an internal output buffer.

Referring again to FIG. 6, a secondary cache memory 26-1 is provided in the outside of the CPU 22-1. The secondary cache memory 26-1 is controlled by a secondary cache controller 28. The CPU 22-2 and secondary cache memory 26-2 can be extended as necessary for the CPUs 22-1 and 26-1. Subsequent to the secondary cache controller 28, a local storage unit 34 is provided through a memory access unit 30. The local storage unit 34 becomes an external memory for the CPU 22-1. Further, an ROM 36 in which various kinds of control programs to be executed by the CPU 22-1 have been stored is provided. A memory mapped register 68 is provided for the local storage unit 34 in correspondence to the CPU 22-1. The memory mapped register 68 is used as a control register of the I/O control apparatuses 18-1 to 18-4 in FIG. 5. The CPU 22-1 executes a memory mapped register write instruction of the control program, thereby writing data into the memory mapped register 68 of the local storage unit 34. Generally, the write instruction for the memory mapped register 68 is performed by sequentially executing a plurality of write instructions. When the write instruction for the memory mapped register 68 as a target is executed a plurality of number of times and the writing operation is completed, the CPU 22-1 executes a read instruction of the memory mapped register 68 and executes the control operation for the I/O control apparatus on the basis of the read data. The execution of the write instruction of the memory mapped register 68 in the CPU 22-1 is finished by storing a write address and write data into the storage buffer 24-1 which functions as an internal output buffer. Prior to executing the read instruction for the memory mapped register 68 by the next CPU 22-1, the write address and write data stored in the storage buffer 24-1 are transferred to the secondary cache memory 26-1 and, further, transferred to a sync buffer circuit section 32 in the memory access unit 30 newly provided in the invention.

The sync buffer circuit section 32 has a circuit construction of FIG. 8. A using state display register 54, a write address holding register 56, and a write data holding register 58 are provided for a register circuit 52. The using state display register 54 is, for example, a register of 32 bits shown in FIG. 9A. A busy bit 55 indicative of the presence or absence of a using state of the sync buffer circuit section 32 is provided for the first bit. The busy bit 55 is set to bit 1 when the data is stored in the write address holding register 56 and write data holding register 58. When no data is stored, the busy bit 55 is set to bit 0. Each of the write address holding register 56 and write data holding register 58 also uses a register of 32 bits as shown in FIGS. 9B and 9C.

Referring again to FIG. 8, the sync buffer circuit section 32 has transfer circuits 46 and 60, a CPU instruction detecting and decoding circuit 48, and a register control circuit 50. The transfer circuit 46 transfers an address and data between this transfer circuit and the secondary cache controller 28 through the internal bus of the processor machine. The CPU instruction detecting and decoding circuit 48 monitors a state of an internal bus from the secondary cache controller 28 for the transfer circuit 46 and detects the bus operation in association with the execution of the write instruction of the memory mapped register by the CPU 22-1 and outputs a detection result to the register control circuit 50. The register control circuit 50 receives the write address and write data for the memory mapped register from the secondary cache controller 28 which were received by the transfer circuit 46 and stores the reception address and reception data into the write address holding register 56 and write data holding register 58 of the register circuit 52. After the write address and write data were stored, the busy bit 55 of the using state display register 54 is set to bit 1. In a holding state of the write address and write data of the memory mapped register, when the register control circuit 50 receives a detection output of the bus operation in association with the execution of the read instruction from the CPU instruction detecting and decoding circuit 48, the register control circuit 50 reads out the write address of the write address holding register 56 and the write data of the write data holding register 58 in the register circuit 52 and executes the writing operation for the memory mapped register 68 of the local storage unit 34 through the transfer circuit 60. The contents of the registers 54, 56, and 58 provided for the register circuit 52 can be also cleared by the end of the writing operation for the memory mapped register 68. It is also possible to construct in a manner such that by leaving those contents without clearing, the register is merely rewritten when the next data transfer is performed. Further, as necessary, it is also possible to provide a valid bit for each register and to control the writing operation and the write inhibition of the register by the valid bit.

Referring again to FIG. 6, an interruption controller 38 is provided subsequently to the memory access unit 30. The interruption controller 38 detects various kinds of external interruptions and instructs an interrupting process according to the result of the discrimination about the external interruption to the CPU 22-1. Further, a unit comprising a message controller 40-1 and an input/output bus controller 42-1 is provided for the I/O bus 16-1. Similarly, a unit comprising a message controller 40-2 and an input/output bus controller 42-2 is provided for the I/O bus 16-2. Further, system bus controllers 44-1 and 44-2 are provided for the system buses 14-1 and 14-2, respectively. The CPU 22-2 and secondary cache memory 26-2 can be extended for the processor machine. In case of extending the CPU 22-2, an exclusive-use memory mapped register is provided for the local storage unit 34.

Figure 10:
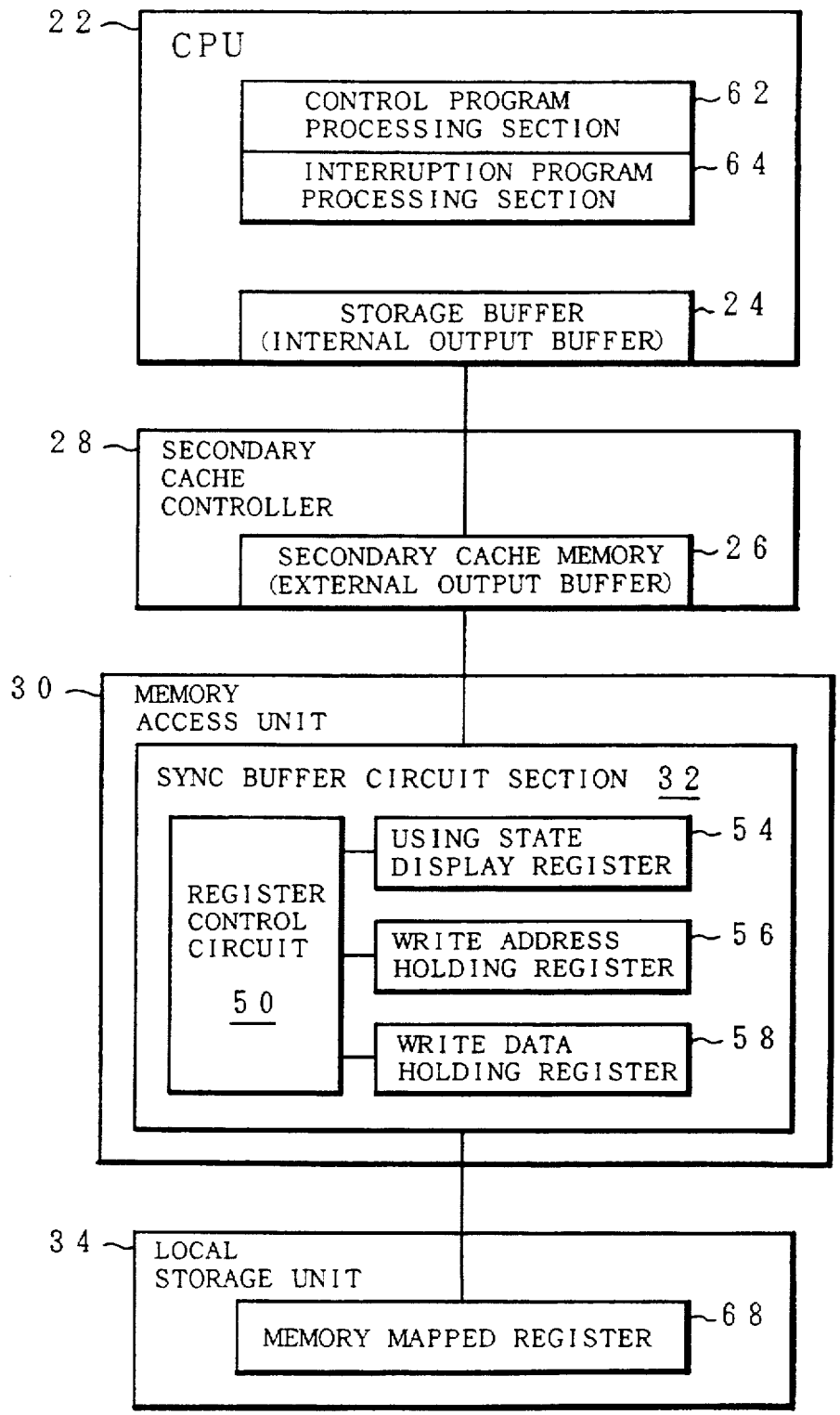
FIG. 10 is a block diagram of a processing function of the invention.

FIG. 10 shows an accessing function by the processor machine of the invention for the memory mapped register 68 provided for the local storage unit 34. First, a control program processing section 62 to execute an ordinary control program is provided for a CPU 22. Processes which are executed by the control program processing section 62 also includes the execution of an access instruction for each of the memory mapped registers 68 provided for the local storage unit 34. Only the access instruction of the control program for the memory mapped register 68 will now be described as an example hereinbelow. An interruption program processing section 64 is provided for the CPU 22. When receiving an instruction to activate the interruption based on the occurrence of an external interruption from the interruption controller 38 (refer to FIG. 6) during the execution of the control program by the control program processing section 62, the interruption program processing section 64 interrupts the control program that is executed by the control program processing section 62 and executes an interruption program corresponding to an interruption gain. The interruption process by the interruption program processing section 64 also includes an interruption processing program for executing an access instruction for the memory mapped register 68 as a target provided for the local storage unit 34.

When the control program processing section 62 executes, for example, a write instruction of the memory mapped register 68 of the local storage unit 34, the write address and write data are stored into a storage buffer 24 serving as an internal output buffer, so that the write instruction is finished. Ordinarily, the writing to the memory mapped register 68 is completed by executing a plurality of write instructions. Therefore, the write addresses and write data of the number corresponding to the number of write instructions are stored into the storage buffer 24. After completion of the execution of the plurality of write instructions, the control program processing section 62 executes the read instruction of the memory mapped register 68. Prior to executing the read instruction, the write addresses and write data stored in the storage buffer 24 are transferred to the sync buffer circuit section 32 provided for the memory access unit 30 via an external output buffer 26 which is realized by the cache memory of the secondary cache controller 28. The write address and write data transferred from the storage buffer 24 are stored into the write address holding register 56 and write data holding register 58 by the register control circuit 50. In this instance, the busy bit 55 of the using state display register 54 is set to bit 1, thereby indicating that the sync buffer circuit section 32 is in a using state. The data transfer from the storage buffer 24 is executed at a timing when a fetching cycle operation of the read instruction to be executed next in the control program processing section 62 is detected. Subsequently, the read instruction advances to the executing cycle and the read instruction is executed. The execution of the read instruction is realized by transferring a read command and a read address to the memory access unit 30 through an internal bus. In response to the execution of the read instruction by the CPU 22, in the sync buffer circuit section 32, the bus operation of the internal bus in association with the read instruction is detected by the CPU instruction detecting and decoding circuit 48 (refer to FIG. 8). On the basis of the detection of the bus operation, the register control circuit 50 reads out the write address in the write address holding register 56 and the write data in the write data holding register 58 and instructs a writing operation to the local storage unit 34. Thus, the writing operation of the write data transferred to a memory mapped register 68-1 designated by the write address is executed. At the same time, since a read command of the memory mapped register 68-1 has been sent from the CPU 22 to the memory access controller 30, read data has to be responded. In the ordinary reading operation, the data is read out from the memory mapped register 68-1 of the local storage unit 34. However, the data written in the memory mapped register 68-1 in this instance is the write data of the write data holding register 58 of the sync buffer circuit section. Therefore, the reading operation from the memory mapped register 68-1 is not executed but after completion of the writing operation of the write data of the write data holding register 58, the write data in the write data holding register 58 is read out and is responded to the CPU as read data of a dummy via the internal bus.

Figure 11:
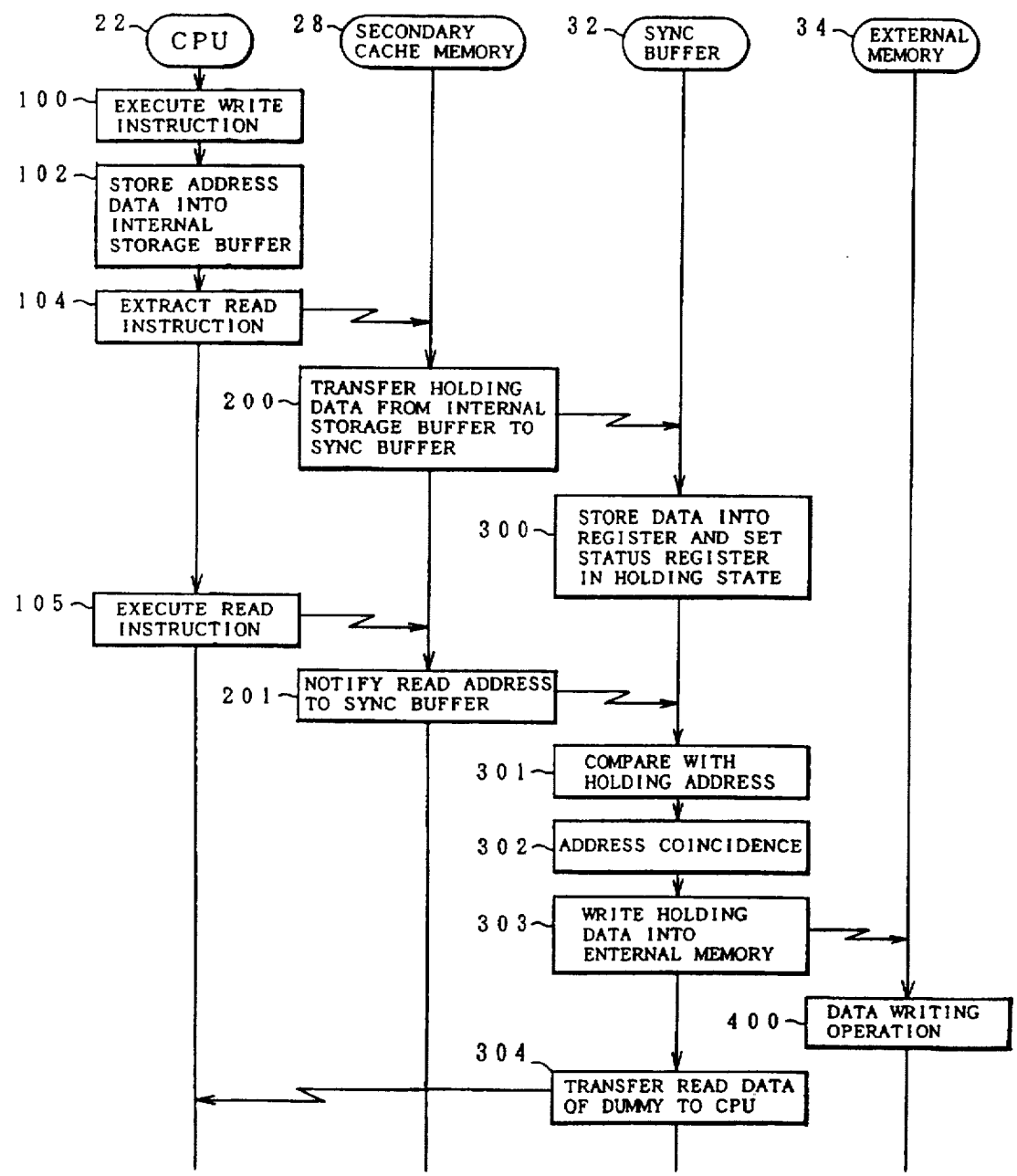
FIG. 11 is a time chart until the writing operation is normally executed from the execution of a write instruction.

FIG. 11 shows processes which are executed until the writing operation is normally finished after the control program processing section 62 of the CPU 22 executes the write instruction for the memory mapped register 68 in FIG. 10. First in block 100, the CPU 22 executes the write instruction of the memory mapped register. In block 102, the write address and write data are stored into the internal storage buffer 24 and the instruction is finished. Subsequently, the CPU 22 extracts the read instruction, namely, executes a fetching operation in block 104. In response to the fetching of the read instruction, as shown in block 200, a buffer transfer for transferring the data held in the storage buffer 24 to the sync buffer circuit section 32 is executed from the storage buffer 24 to the secondary cache memory 26. Further, the data is transferred from the secondary cache memory 26 to the sync buffer circuit section 32. The transferred data (write address and write data) is stored into the corresponding register. Moreover, the using state display register (status register) 54 is set into the data holding state. Subsequently, the CPU 22 executes the read instruction in block 105. As shown in block 201, the read instruction is notified to the sync buffer circuit section 32 via the secondary cache memory 26. Specifically speaking, a hit discrimination of the secondary cache is performed for the read instruction. In this case, since the secondary cache causes a mishit, the read command and read address are transferred to the memory access unit 30 provided for the sync buffer circuit section 32 via the bus. In response to the bus operation in association with the execution of the read instruction as mentioned above, when the sync buffer circuit section 32 detects the execution of the read instruction, the address held at present is compared with the read address notified from the CPU in block 301. When the coincidence of those addresses is obtained in block 302, the holding data is written into the memory mapped register that is designated by the write address of the local storage unit 34 serving as an external memory in block 303. Such an operation is the data writing operation in block 400 of the external memory 34. When the data writing operation of the external memory 34 to the memory mapped register is normally finished, the sync buffer circuit section 32 reads out the write data held in the register and transfers as read data of a dummy to the CPU 22, thereby finishing the execution of the read instruction.

Figure 12:
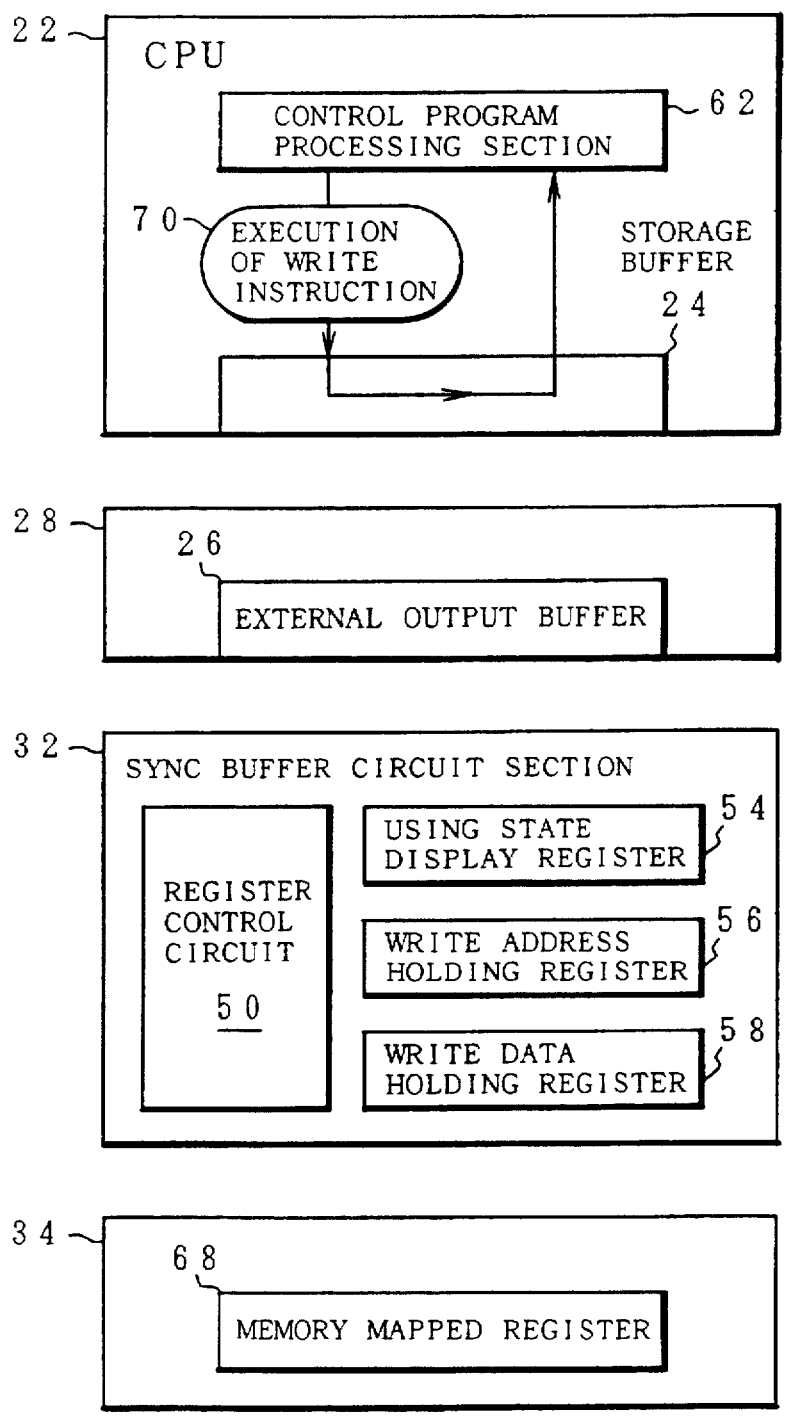
FIG. 12 is an explanatory diagram of an executing cycle of the write instruction.
Figure 13:
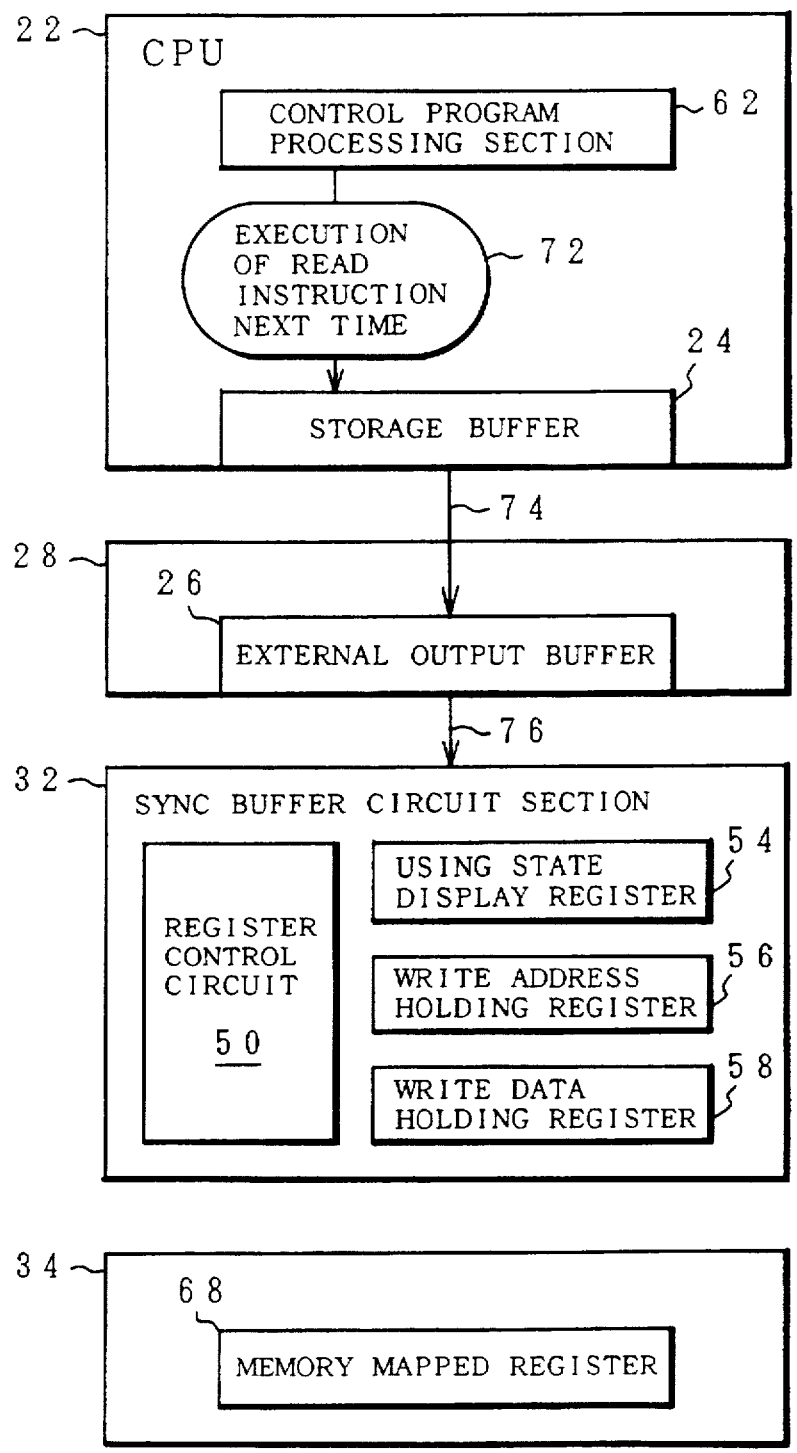
FIG. 13 is an explanatory diagram of a transfer cycle which is executed prior to a read instruction.
Figure 14:
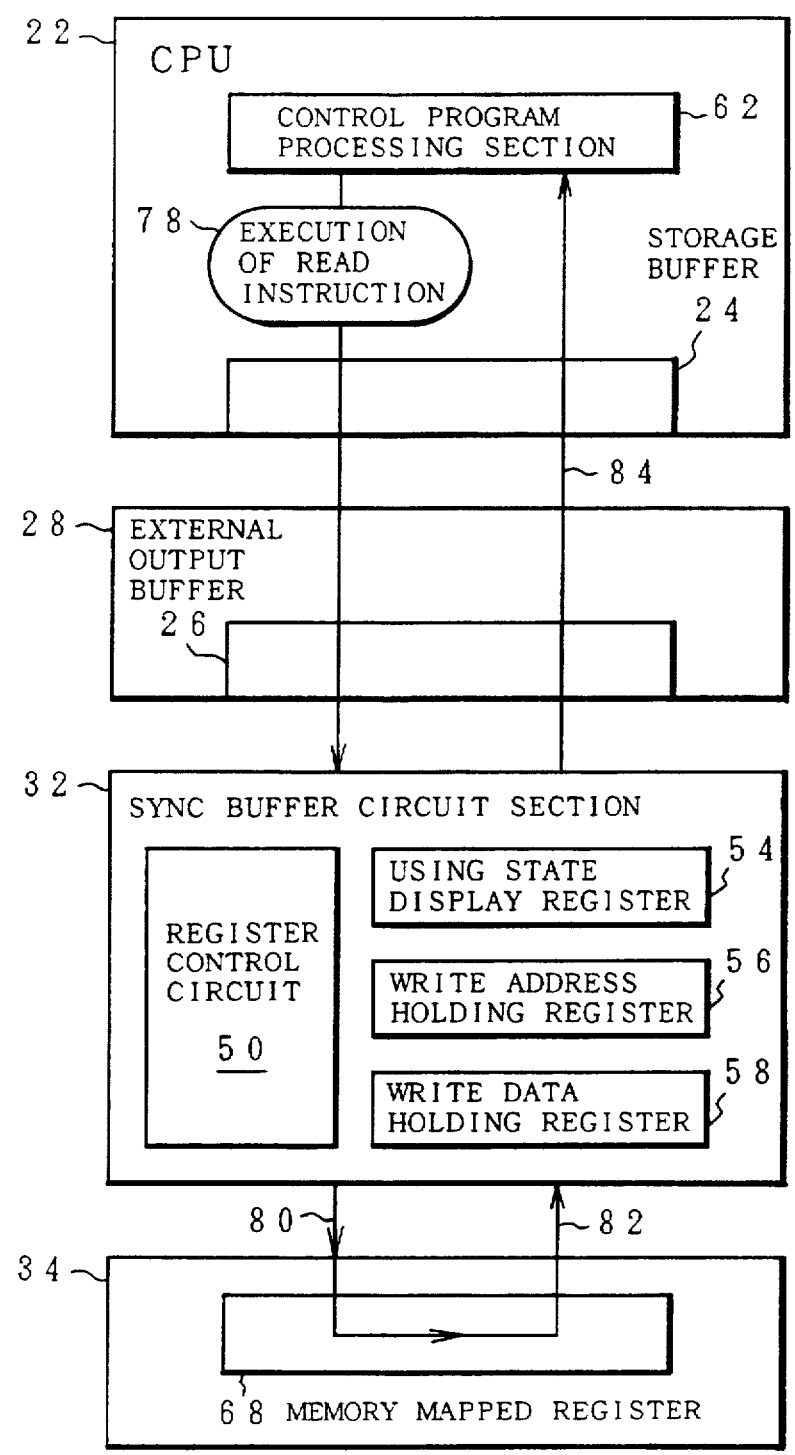
FIG. 14 is an explanatory diagram of a writing cycle synchronized with the execution of the read instruction.

FIGS. 12, 13, and 14 divisionally show the processes which are executed until the data writing operation is normally finished after the execution of the write instruction for the memory mapped register in FIG. 11. First, FIG. 12 shows the process for executing the write instruction for the memory mapped register in the CPU 22. The control program processing section 62 performs a write instruction execution 70 for the memory mapped register 68 of the external memory 34. The write instruction execution 70 is normally finished by storing the write address and write data into the storage buffer 24 provided in the CPU 22.

FIG. 13 shows the case where subsequently to the execution of the write instruction, the control program processing section 62 of the CPU 22 performed a read instruction extraction 72 to be executed next. In response to the read instruction extraction 72, the write address and write data stored in the storage buffer 24 for the memory mapped register 68 are transferred to the sync buffer circuit section 32 via the external output buffer serving as a cache memory 26 of the secondary cache controller 28 and are stored into the write address holding register 56 and write data holding register 58. Further, the busy bit of the using state display register 54 is set to 1.

FIG. 14 shows the process of a read instruction execution 78 by the control program processing section 62 of the CPU 22 subsequent to the read instruction extraction 72. In association with the read instruction execution 78, the read command and read address are transferred to the sync buffer circuit section 32 of the memory access unit via the secondary cache controller 28 by the internal bus. By detecting such a bus operation, the read instruction execution 78 of the CPU 22 can be detected by the sync buffer circuit section 32. When the execution of the read instruction is detected by the sync buffer circuit section 32, the write address of the write address holding register 56 is compared with the read address indicated from the CPU 22. When those addresses coincide, a writing operation 80 for transferring the write address and write data held at present from the sync buffer circuit section 32 to the external unit as a local storage unit 34 together with the write command is executed and they are written into the memory mapped register 68. When the writing operation to the memory mapped register 68 can normally be performed, a status response 82 of the normal end is obtained. When receiving the end response 82, the sync buffer circuit section 32 reads out the write data of the write data holding register 58 as a response to the read instruction execution 78 of the CPU 22 and transfers as read data of a dummy by the bus. When the read address received by the read instruction execution 78 of the CPU 22 doesn't coincide with the address held in the sync buffer circuit section 32, the ordinary reading operation for the local storage unit 34 by the memory access unit 30 (refer to FIG. 6) built in the sync buffer circuit section 32 is executed.

Figure 15:
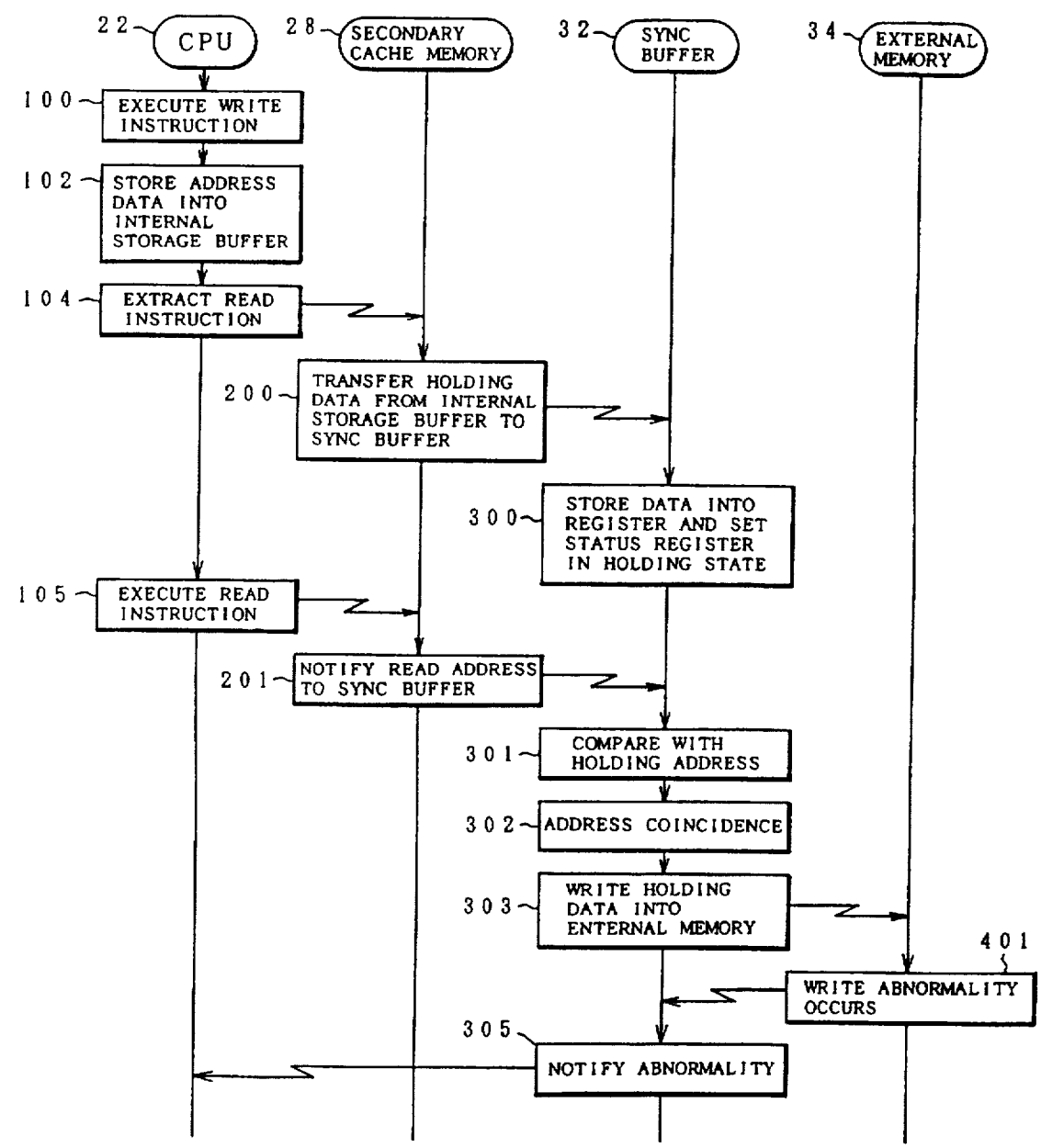
FIG. 15 is a time chart when an abnormality occurs in the writing operation.

FIG. 15 shows a time chart in the case where an abnormality occurs by the writing operation for the memory mapped register. In the writing operation for the memory mapped register of the external memory 34 in block 303, when a writing abnormality occurs in block 401, an abnormality is notified to the CPU 22 in block 305 in response to such an abnormality. The read data (dummy data) is also responded simultaneously with the abnormality notification.

Figure 16:
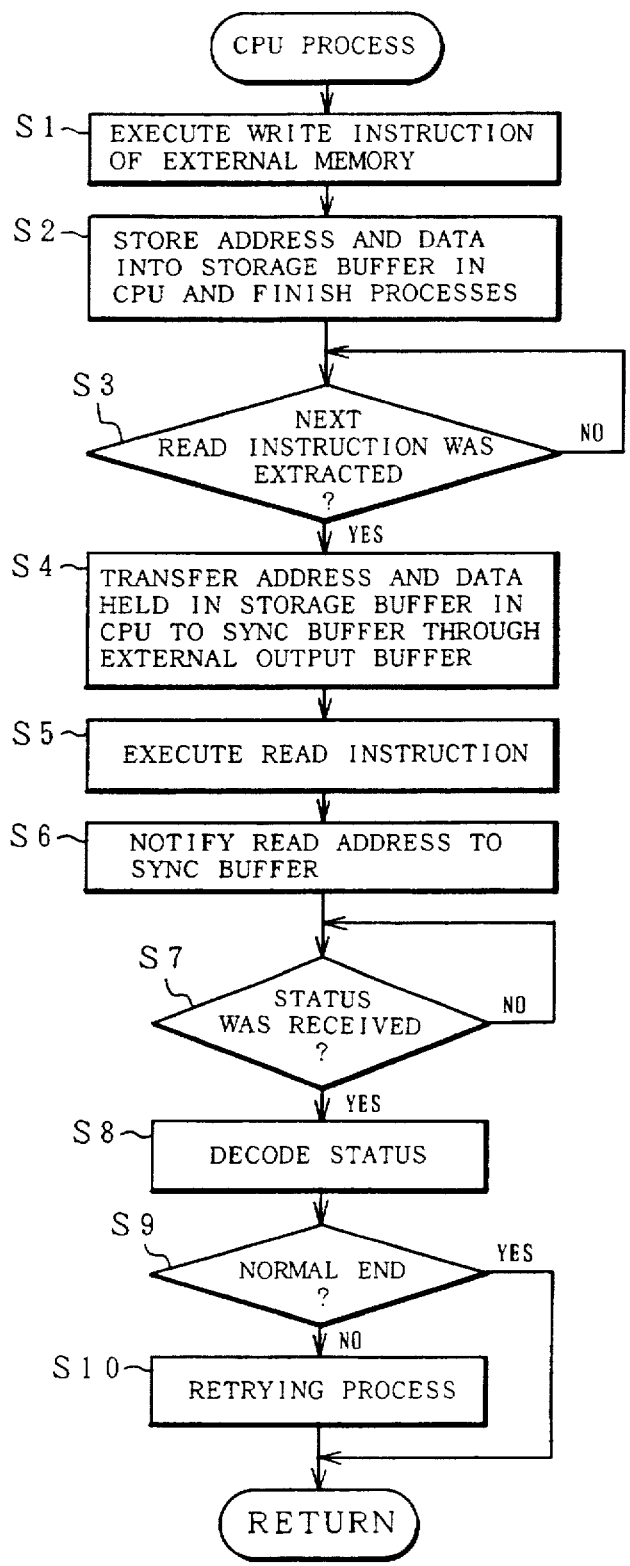
FIG. 16 is a flow chart for a control program process of the CPU.

FIG. 16 shows a flowchart for an accessing process of the memory mapped register by the control program processing section 62 provided for the CPU 22 in FIG. 10. First in step S1, when the write instruction to the external memory is executed, the write address and write data are stored into the storage buffer 24 in the CPU 22 and the process is finished in step S2. In step S3, when it is discriminated that the next instruction is the read instruction of the external memory, in step S4, the write address and write data held in the storage buffer 24 in the CPU 22 are transferred to the sync buffer circuit section 32 through the secondary cache memory 26 serving as an external output buffer. Subsequently, in step S5, the read instruction of the external memory is executed. In association with the execution of the read instruction, the read command and read address are notified by the bus operation for the sync buffer circuit section in step S6. Subsequently, in step S7, a check is made to see if a status response to a status command from the external memory has been received or not. When the status response is received, the status is decoded in step S8. When the read data is normally responded from the external memory by the status decoding and the writing operation to the external memory from the sync buffer circuit section 32 is normally finished, the series of processes are finished. On the other hand, in the case where although there is a response of the read data from the external memory, an abnormality in the writing operation for the external memory is notified from the sync buffer circuit section synchronously with such a response, step S10 follows. A retrying process to again execute the write instruction at which an abnormality occurred in the writing operation of the memory mapped register of the external memory is executed and the writing operation is again performed.

Figure 17:
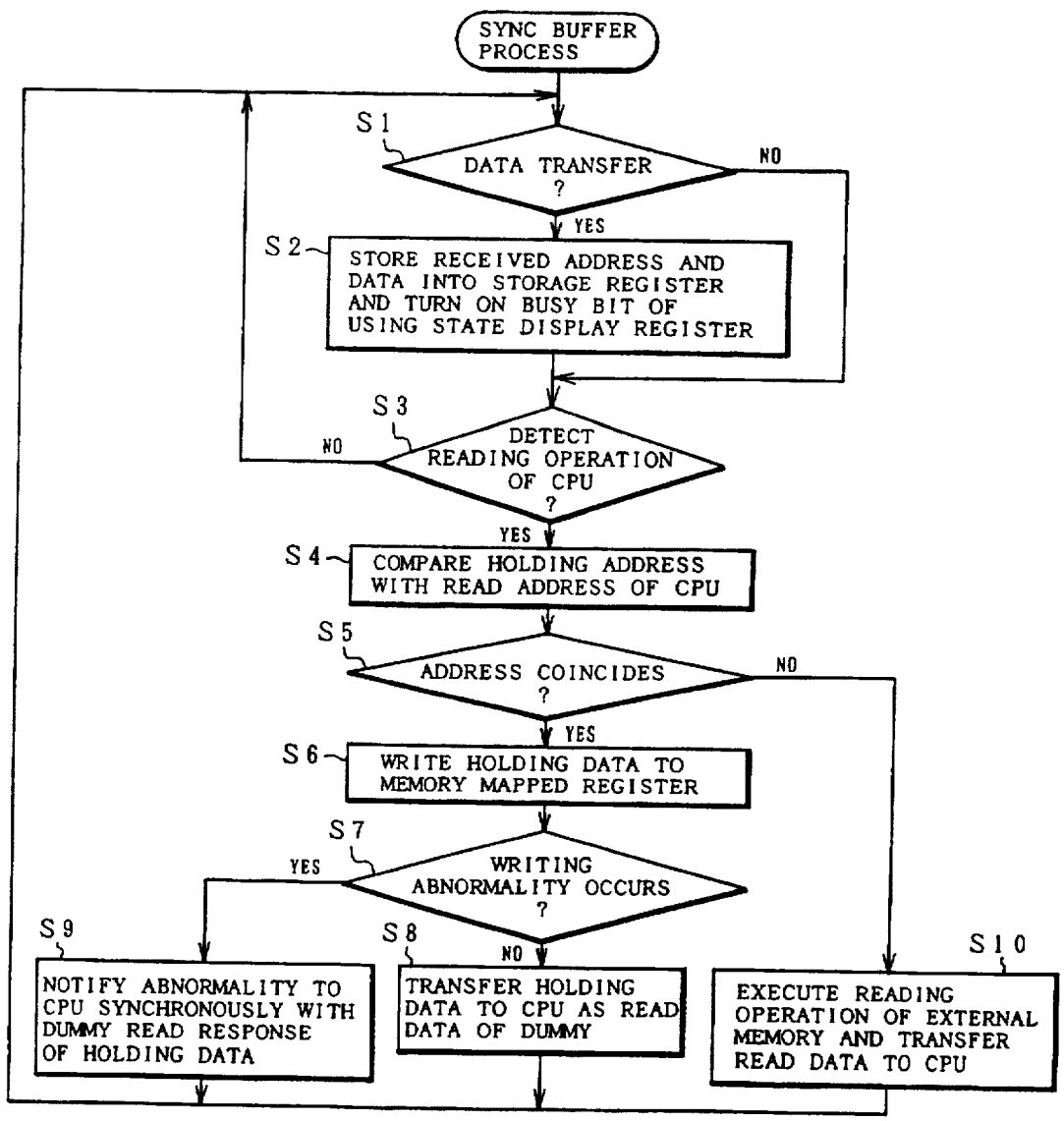
FIG. 17 is a flowchart for the processing operation of the sync buffer circuit section.

FIG. 17 shows a flowchart for the processing operation of the sync buffer circuit section in FIG. 10. In the embodiment of the invention, the sync buffer circuit section is constructed by a hardware as shown in FIG. 8. Therefore, the flowchart of FIG. 17 shows the operating procedure of the hardware. In case of realizing, the sync buffer circuit section 32 by a software by a microprocessor, a program process is executed in accordance with the flowchart of FIG. 17.

In FIG. 17, the sync buffer circuit section 32 discriminates the presence or absence of a data transfer from an upper-level output buffer section in step S1. When the data transfer of the write address and write data to the memory mapped register of the external memory is received, in step S2, the address and data received are stored into the write address holding register 56 and write data holding register 58, respectively, and the busy bit 55 of the using state display register 54 is turned on. Subsequently, in step S3, the reading operation of the CPU 22 is monitored. When the read instruction is executed by the CPU 22 and the reading operation of the CPU is detected in the internal bus from the bus operation in which the read command and read address are displayed, the address held in the write address holding register 56 is compared with the read address of the CPU in step S4. When the coincidence of those addresses is obtained in step S5, the writing operation to write the holding data into the memory mapped register of the external memory is executed in step S6. When the writing operation is normally executed, the processing routine advances from step S7 to step S8. The holding data of the write data holding register 56 of the sync buffer circuit section 32 is read out and is transferred to the CPU 22 as read data of a dummy. An end response is performed. On the other hand, when an abnormality occurs in the writing operation of the memory mapped register, step S9 follows. In a manner similar to step S8, an abnormality notification of the writing operation is responded to the CPU synchronously with the response of the holding data as dummy read data. When receiving the abnormality notification of the writing operation, the CPU immediately recovers the writing operation due to the retrying process as shown in step S10 in FIG. 16. When the holding address doesn't coincide with the read address of the CPU in step S5, since this means that the instruction is not the read instruction of the data held in the sync buffer circuit section 32, the processing routine advances to step S10. The reading operation of the external memory is executed in a manner similar to the ordinary procedure and the read data is transferred to the CPU 22. Such operations are realized by the function of the memory access unit 30 having the sync buffer circuit section 32.

Figure 18:
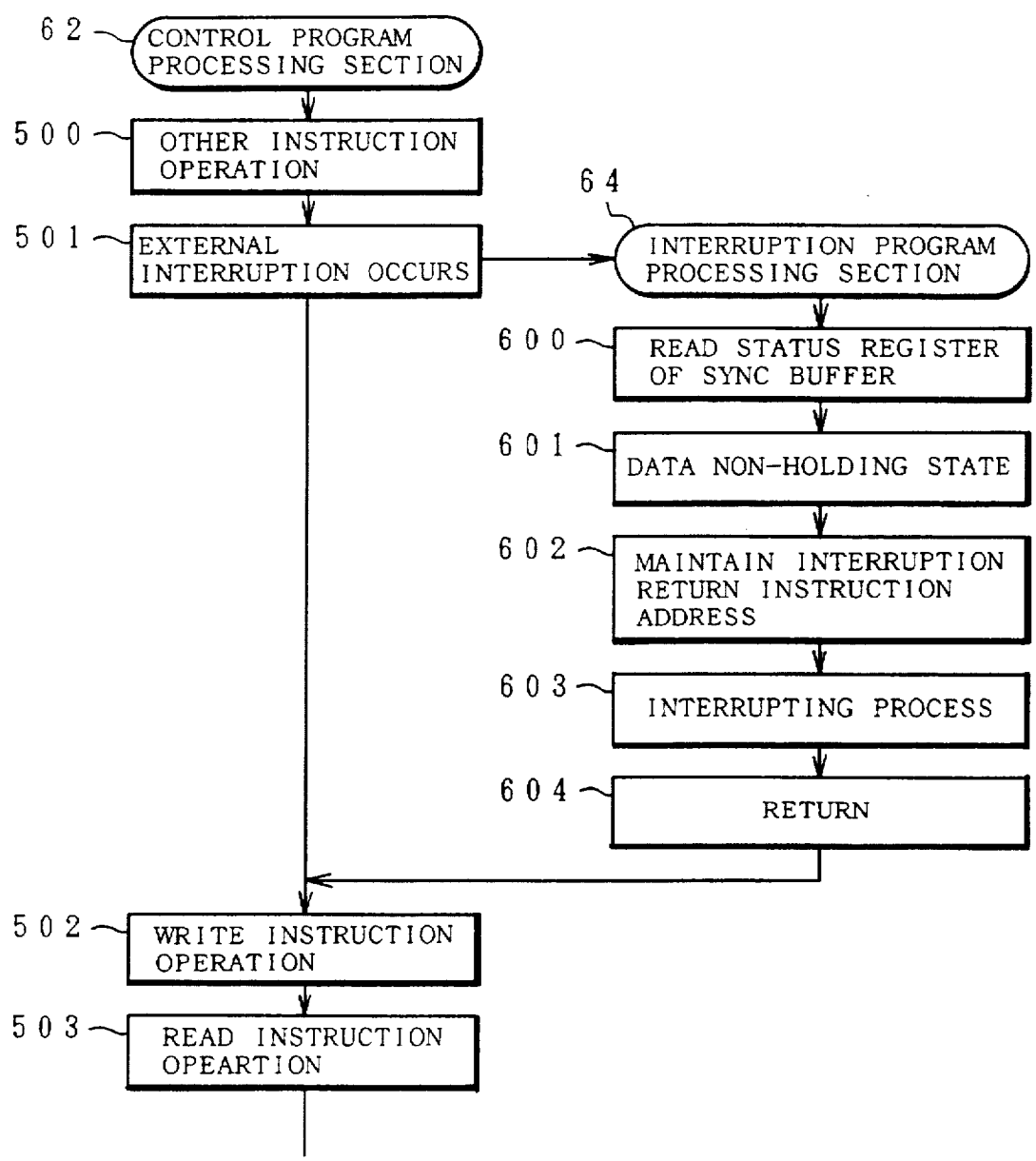
FIG. 18 is a time chart when an external interruption occurs before the execution of the write instruction.

Processes of the interruption program processing section 64 in the case where an external interruption occurred for the same memory mapped register 68 during the execution of the write instruction and read instruction for the memory mapped register 68 by the control program processing section 62 provided for the CPU 22 will now be described. FIG. 18 is a time chart in the case where the control program processing section 62 executes another instructing operation in block 500 and, before the write instructing operation for the memory mapped register is subsequently executed in block 502, an external interruption in block 501 occurs. When the external interruption in block 501 occurs before the write instructing operation for the memory mapped register in block 502 as mentioned above, the interruption program processing section 64 first reads out the using state display register (status register) 54 of the sync buffer circuit section 32 in block 600. In this instance, since the write instructing operation for the memory mapped register in block 502 and the read instructing operation in block 503 are not executed, the sync buffer circuit section 32 is in a data non-holding state as shown in block 601. Namely, when checking the busy bit 55 due to the reading of the using state display register 54, the busy bit 55 is set to bit 0. In this case, in block 602, an interruption return instruction address is maintained as an instruction address of the write instructing operation in next block 502 of the occurrence of the external interruption in block 501 as it is. An interrupting process is executed in block 603. As for the interrupting process in block 603, in a manner similar to the process by the control program processing section 62, as shown in FIG. 12, the interruption program processing section 64 of the CPU 22 executes the write instruction of the memory mapped register 68 and stores the write data and read data into the storage buffer 24. Prior to the next read instruction of the memory mapped register 68, as shown in FIG. 13, after the write address and write data were transferred to the sync buffer circuit section 32 through the secondary cache memory (external output buffer) 26 from the storage buffer 24 and stored into the write address holding register 56 and write data holding register 58, the busy bit 55 of the using state display register 54 is turned on to bit 1. Subsequently, as shown in FIG. 14, when the read instruction of the memory mapped register 68 is executed in the CPU 22 by the control program processing section 62, the reading operation of the bus in association with it is detected by the sync buffer circuit section 32. The holding address and read address are compared. Since the coincidence of those addresses is obtained, the writing operation of the holding data for the memory mapped register 68 is executed. After completion of the interrupting process for the memory mapped register 68 in block 603 as mentioned above, the address is returned in block 604 to the interruption return instruction address set in block 602. After completion of the interruption, the control program processing section 62 executes the instructing operation for the memory mapped register in block 502.

Figure 19:
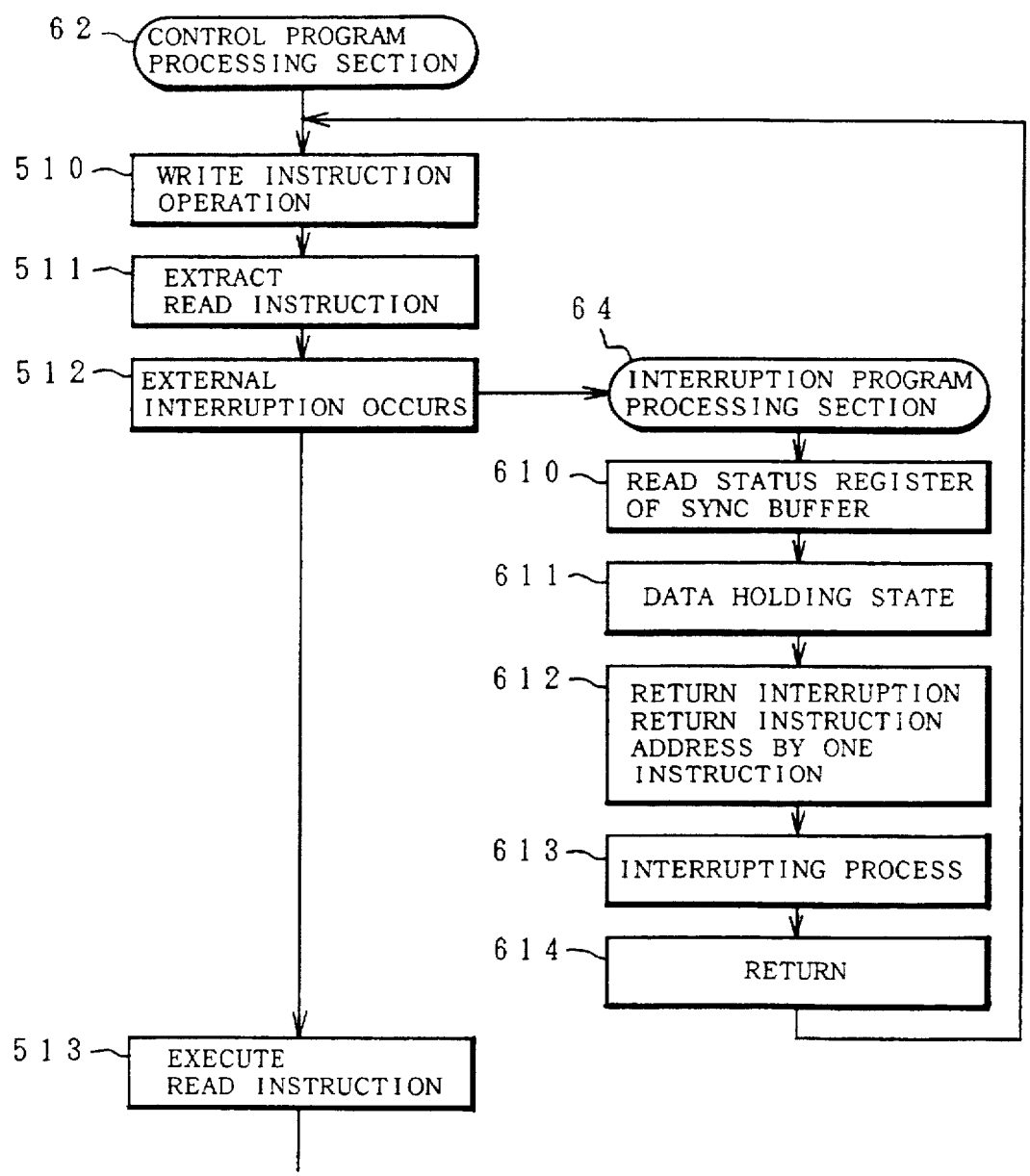
FIG. 19 is a time chart when an external interruption occurs before the execution of the read instruction after completion of the execution of the write instruction.

FIG. 19 is a flowchart for processes which are executed in the case where the write instructing operation for the memory mapped register is executed by the control program processing section 62 in block 510 and the read instruction of the memory mapped register is fetched in block 511 and an external interruption in block 512 occurs for a period of time until the read instruction is subsequently executed in block 513. In a state in which the external interruption occurs in block 512, the write address and write data stored in the storage buffer 24 by the CPU 22 by the write instructing operation in block 510 are transferred to the sync buffer circuit section 32 in response to the extraction of the read instruction in block 511. The sync buffer circuit section 32 is in the data holding state. In this state, when the interruption program processing section 64 is activated by the occurrence of an external interruption in block 512, first in block 610, the using state display register (status register) 54 of the sync buffer circuit section 32 is read out. Since the data has already been written in this instance, the busy bit 55 is set to bit 1 and the data holding state is recognized in block 611. When the data holding state is recognized, since the holding data of the sync buffer circuit section 32 is broken by the interrupting process that is at present being executed, a process to return a return instruction address to the write instruction by which the data that is at present in the holding state was written is executed in block 612. Namely, the inherent interruption return instruction address is the instruction address of the read instruction to be executed in next block 513 by the occurrence of the external interruption in block 512. However, in block 612, the interruption return instruction address of the read instruction is set to an instruction address of the write instruction in block 510 which was returned by one instruction. Subsequently in block 613, an interrupting process accompanied with the execution of the write instruction and read instruction for the memory mapped register is executed. A returning process in block 614 by the end of the interruption is set to an instruction address of the write instruction before the occurrence of the external interruption which was returned in block 612. The control program processing section 52 again executes the write instructing operation from block 510. By the write instructing operation in block 510 after completion of the interruption, the data of the sync buffer circuit section 32 which was broken by the occurrence of the external interruption is recovered through the extraction of the read instruction in next block 511. If the external interruption doesn't continuously occur, in block 513, the writing operation of the data held in the sync buffer circuit section 32 to the memory mapped register is executed. Therefore, even if the data held in the sync buffer circuit section 32 is broken by the occurrence of the external interruption, the correct writing operation to the memory mapped register can be executed after completion of the interruption.

Figure 20:
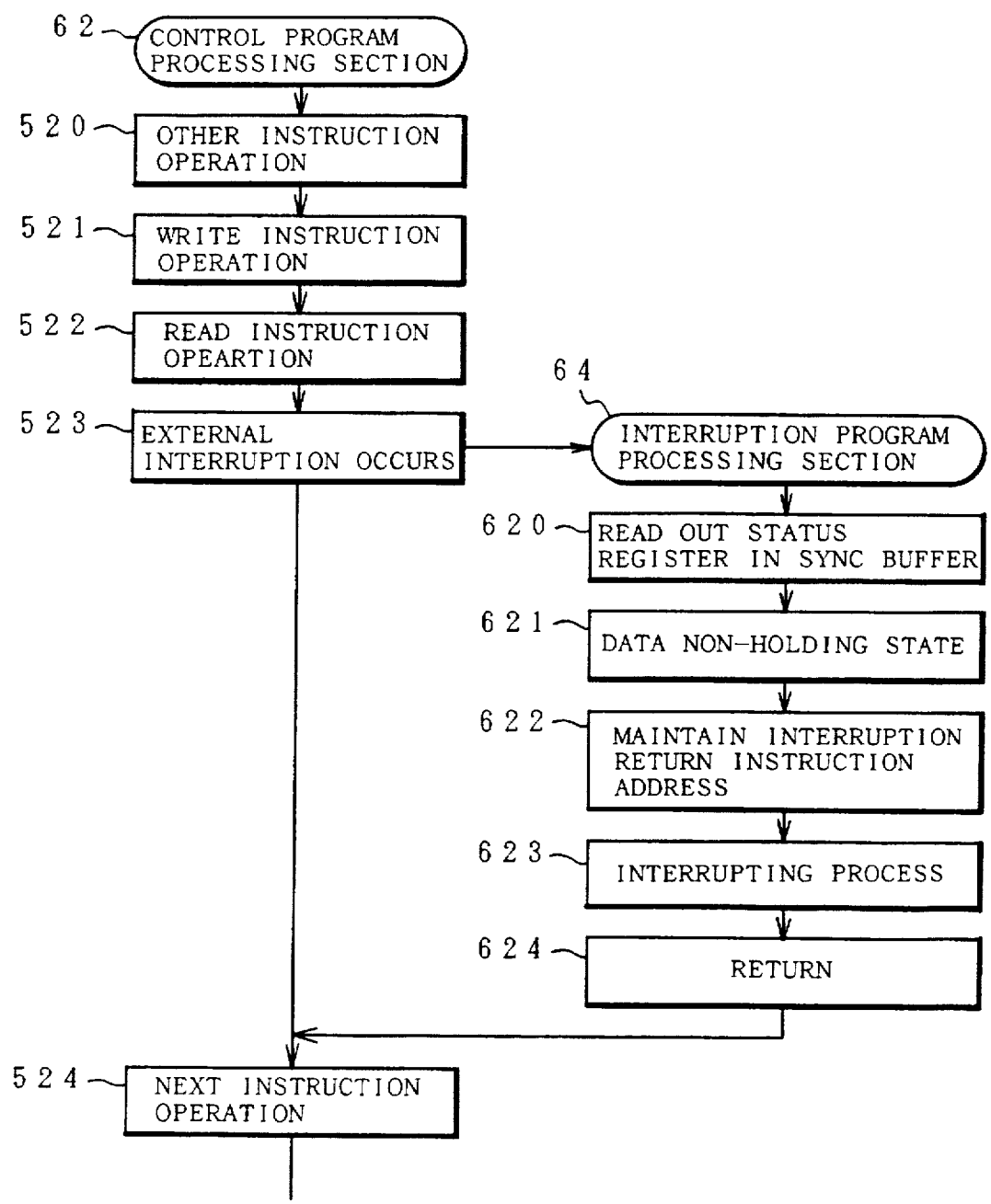
FIG. 20 is a time chart when an external interruption occurs after completion of the execution of the read instruction.

FIG. 20 shows an interrupting process in the case where the write instructing operation is executed in block 521 and the read instructing operation is performed in next block 522 and, after that, the external interruption occurs in block 523. When the external interruption occurs in block 523 after completion of the read instructing operation in block 522, since the holding data of the sync buffer circuit section 32 has already been written in the memory mapped register 68, even if the data stored in the sync buffer circuit section is broken, there is no problem. The interrupting process is executed while maintaining the interruption return instruction address. Processes in blocks 620 to 624 by the interruption program processing section 64 in such a case are similar to the interrupting process before the write instructing operation in FIG. 18.

Figure 21:
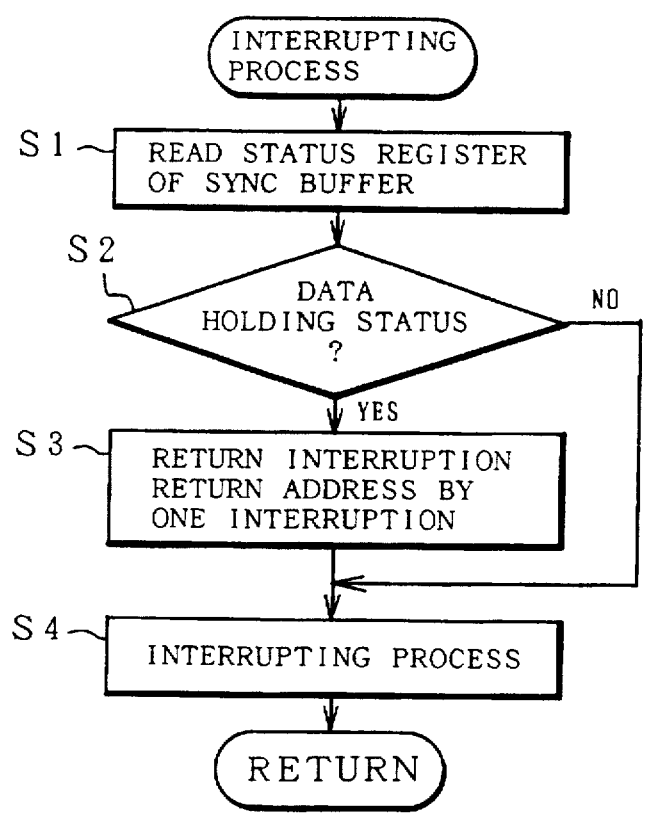
FIG. 21 is a flowchart for an interrupting process.

A flowchart of FIG. 21 shows the interrupting process of the interruption program processing section 64 of the invention. When the interrupting process is activated by the external interruption, in step S1, the using state display register (status register) 54 of the sync buffer circuit section is read. A check is made to see if the sync buffer circuit section is in the data holding state or not on the basis of the state of the busy bit 55. When it is judged in step S2 that the sync buffer circuit section is in the data holding state, a process to return the interruption return address of the control program by one instruction is executed in step S3. The interrupting process is executed in step S4 and the processing routine is returned to the interruption return address of the control program set in step S3. On the other hand, when the busy bit is set to bit 0 and the sync buffer circuit section is not in the data holding state in step S2, the process to return the interruption return address by one instruction in step S3 is not executed. The interrupting process in step S4 is executed while maintaining the next instruction address in which the interruption occurrence was caused as an interruption return address. The processing routine is returned to the control program.

According to the invention as mentioned above, in the interrupting process by the occurrence of the external interruption, a check is made to see if the data to be written in the memory mapped register serving as an access target is in the holding state in the sync buffer circuit section or not. When it is in the data holding state, since there is a possibility such that the holding data is broken by the execution of the interrupting process, by returning the operation of the control program to the state before the writing operation of the holding data, a mask control process of the CPU in the control program is made unnecessary. An overhead of the control program is reduced. The writing operation for the external target using the output buffer can be certainly executed without deteriorating the interruption response speed.

Although the above embodiment has been shown and described with respect to the example of the memory mapped register on the external memory as an access target out of the CPU, the invention is not limited to such a register. Similar processes can be also applied to a proper access target existing in the outside of the CPU. Further, the invention is not limited by the numerical values shown in the embodiment.

What is claimed is:

1. A processor comprising:

a CPU having a control program processing section for executing an instruction according to a control program;

an external memory in communication with said CPU; said external memory having a memory mapped register in communication with said CPU;

an output buffer section connected to said CPU for receiving and storing a write address and write data using a memory mapped register write instruction executed by the control program processing, section, thereby finishing the execution of the memory mapped register write instruction;

a memory access unit connected to said output buffer section and through which said CPU communicates with said external memory, said memory access unit being provided with:

a using state display register showing a holding state of the write address and the write data;

a write address holding register for holding the write address;

a write data holding register for holding the write data; and a sync buffer circuit section for storing the write address and the write data transferred from said output buffer section into said write address holding register and said write data holding register when a memory mapped register read instruction is fetched subsequently to the end of the execution of the memory mapped register write instruction, for setting said using state display register into a data holding state, for reading the write data in said write data holding register and writing said write data into said memory mapped register in association with the execution of the memory mapped register read instruction by said control program processing section, and for allowing said CPU to respond the write data read out from said write data holding register as read data by the memory mapped register read instruction synchronously with the transfer and writing into the memory mapped register.

2. An apparatus according to claim 1, wherein when the writing operation to said memory mapped register is normally finished, said sync buffer circuit section responds the data of said write data holding register as read data of a dummy to said CPU after completion of said writing operation.

3. An apparatus according to claim 1, wherein when an abnormality occurs in the writing operation to said memory mapped register, said sync buffer circuit section responds the data of said write data holding register as read data of a dummy to said CPU and notifies an abnormal end of the writing operation to said CPU synchronously with the response of said read data.

4. An apparatus according to claim 1, wherein after completion of the writing operation to said memory mapped register, said sync buffer circuit section clears said using state display register into a non-holding state.

5. An apparatus according to claim 1, wherein said CPU has an interruption program processing section for interrupting a process of said program processing section by the occurrence of an external interruption and executing an instruction of an interruption program, and when the external interruption to said memory mapped register occurs, in the case where it is discriminated that the sync buffer circuit section is in the data holding state by referring to said using state display register of said sync buffer circuit section, said interruption program processing section returns a return instruction address to said control program to an address of the write instruction of the write address and the write data in the data holding state, thereby executing said control program from said write instruction address by the end of the interrupting process.

6. An apparatus according to claim 5, wherein in the case where the external interruption occurs for a period of time from the execution of the write instruction to the memory mapped register by said control program to the execution of said read instruction after the write data and the write address of said output buffer section were transferred to said sync buffer circuit section prior to a next read instruction, when it is discriminated that said sync buffer circuit section is in the data holding state by referring to said using state display register of said sync buffer circuit section, said interruption program processing section returns a return instruction address to said control program by one instruction, thereby executing said control program from the write address held in said sync buffer circuit section and the address of the write instruction of the write data by the end of the interrupting process.

7. An apparatus according to claim 1, wherein after executing a plurality of write instructions for said memory mapped register, said control program processing section of said CPU executes the read instruction of said memory mapped register.

8. An apparatus according to claim 7, wherein in the case where an abnormality notification of the writing operation is received from said sync buffer circuit section in association with the end of the execution of the read instruction subsequent to said plurality of write instructions for said memory mapped register, said control program processing section of said CPU executes a subsequent writing operation for said memory mapped register by an execution of a different write instruction train.

9. An apparatus according to claim 8, wherein said memory mapped register is a control register of an input/output control apparatus.

10. An apparatus according to claim 1, wherein said output buffer section is constructed by an internal output buffer built in said CPU and an external output buffer provided in the outside of said CPU, and said control program processing section finishes the write instruction for said memory mapped register by the writing operation for said internal output buffer, and the write address and the read address stored in said internal output buffer are transferred to said sync buffer circuit section via said external output buffer prior to executing the read instruction subsequent to said write instruction.

11. An apparatus according to claim 10, wherein said internal output buffer is a cache memory of a primary cache unit provided in said CPU, and said external output buffer is a cache memory of a secondary cache unit provided in the outside of said CPU.

12. A method of controlling a processor having a CPU for executing an instruction according to a control program, an external memory having mapped thereon a memory mapped register, an output buffer connected to the CPU and a memory access unit connected to the output buffer and through which the memory mapped register communicates with the CPU, the memory access unit provided with a using state display register, a write address holding register, a write data holding register, and a sync buffer circuit section, said method comprising:

a writing step of, when the CPU executes a write instruction to the memory mapped register, writing a write address and write data for the memory mapped register from the CPU into the output buffer and finishing the write instruction;

a buffer transferring step of transferring the write address and the write data of the output buffer section to the sync buffer circuit section, storing said write address and said write data into the write address holding register and the write data holding register when a memory mapped register read instruction is fetched subsequent to the end of the execution of the memory mapped register write instruction, and setting the using state display register into a data holding state; and a synchronizing step of reading out the write data from the write data holding register and transferring and writing the write data into the memory mapped register in association with the execution of the memory mapped read instruction by the CPU, and for allowing the CPU to respond to the write data read from the write data holding register as read data by the memory mapped register read instruction synchronously with the transfer and writing into the memory mapped register.

13. A method according to claim 12, wherein in said synchronizing step, in the case where the writing operation to said memory mapped register is normally finished, the data of said write data holding register is responded as read data of a dummy to said CPU synchronously with the end of the read instruction of said CPU.

14. A method according to claim 12, wherein in said synchronizing step, in the case where an abnormality occurs in the writing operation to said memory mapped register, the data of said write data holding register is responded as read data of a dummy to said CPU, and an abnormal end of the writing operation is notified to said CPU synchronously with the response of said read data.

15. A method according to claim 12, wherein in said synchronizing step, after the data was written to said memory mapped register, said using state display register is cleared to a non-holding state.

16. A method according to claim 12, further having an interruption processing step of, in the case where it is discriminated that said using state display register is in the data holding state by referring to the using state display register of said sync buffer circuit section when an external interruption occurs, returning a return instruction address to said control program to an address of a write instruction of the write address and the write data in said data holding state, thereby executing said control program from said write instruction address by the end of the interrupting process.

17. A method according to claim 16, wherein in said interruption processing step, in the case where the external interruption occurs for a period of time from the execution of the write instruction by said control program to the execution of said read instruction after the write data and the write address of said output buffer unit were transferred to said sync buffer prior to a next read instruction, when said using state display register is in the data holding state by referring to the using state display register of said sync buffer circuit section, the return instruction address to said control program is returned by only one instruction, thereby executing said control program from the write instruction address of the write address and the write address held in said sync buffer circuit section by the end of the interrupting process.

* * * * *